United States Patent [19]

Jones et al.

[11] 4,196,648

[45] Apr. 8, 1980

[54] AUTOMATIC SAWMILL APPARATUS

[75] Inventors: Aaron U. Jones, Eugene, Oreg.; Francis E. Allen, North Vancouver, Canada

[73] Assignee: Seneca Sawmill Company, Inc., Eugene, Oreg.

[21] Appl. No.: 931,721

[22] Filed: Aug. 7, 1978

[51] Int. Cl.² .......................... B27B 5/04; B27B 5/18; G01N 21/22

[52] U.S. Cl. ...................................... 83/365; 144/312; 250/560; 250/561; 356/386

[58] Field of Search ................... 83/71, 282, 365, 371, 83/471.2, 487, 488, 479, 578, 618, 620; 144/312, 3 R

[56] References Cited

U.S. PATENT DOCUMENTS

| | | | |
|---|---|---|---|
| 946,457 | 1/1910 | Miles | 83/210 |
| 1,824,381 | 9/1931 | Sorensen et al. | 83/412 |
| 2,181,398 | 11/1939 | Firestone | 83/367 |
| 3,063,479 | 11/1962 | Prentice | 83/210 |
| 3,320,181 | 7/1967 | Buss et al. | 83/370 X |
| 3,562,538 | 2/1971 | Mergler | 250/222 R |
| 3,811,487 | 5/1974 | Warren et al. | 144/312 |
| 3,886,372 | 5/1975 | Sanglert | 250/571 |
| 3,890,509 | 6/1975 | Mayey | 250/561 |
| 3,890,862 | 6/1975 | Lhenry | 83/71 |
| 3,963,938 | 6/1976 | Sanglert | 144/312 X |
| 3,983,403 | 9/1976 | Dahlström et al. | 144/312 X |
| 3,986,774 | 10/1976 | Lowrey et al. | 356/3 |
| 4,086,496 | 4/1978 | Berry | 144/312 X |

*Primary Examiner*—Donald R. Schran
*Attorney, Agent, or Firm*—Klarquist, Sparkman, Campbell, Leigh, Hall & Whinston

[57] ABSTRACT

A cant or plank is moved forwardly on a conveyor system, where its irregular leading lateral edge is measured by a plurality of fixed scanners. In response to measurement of the cant, conveyor movement is altered for orienting the cant relative to a fixed saw line to be executed by a movable saw. The cant is held or clamped in stationary position while the saw is moved on a carriage relative thereto, resulting in severing of the undesired irregular forward edge. The sawn edge is employed as a reference as the cant is then moved forwardly on a conveyor system, where the measurements obtained from the scanners may be further utilized in cutting the cant into desired widths.

22 Claims, 29 Drawing Figures

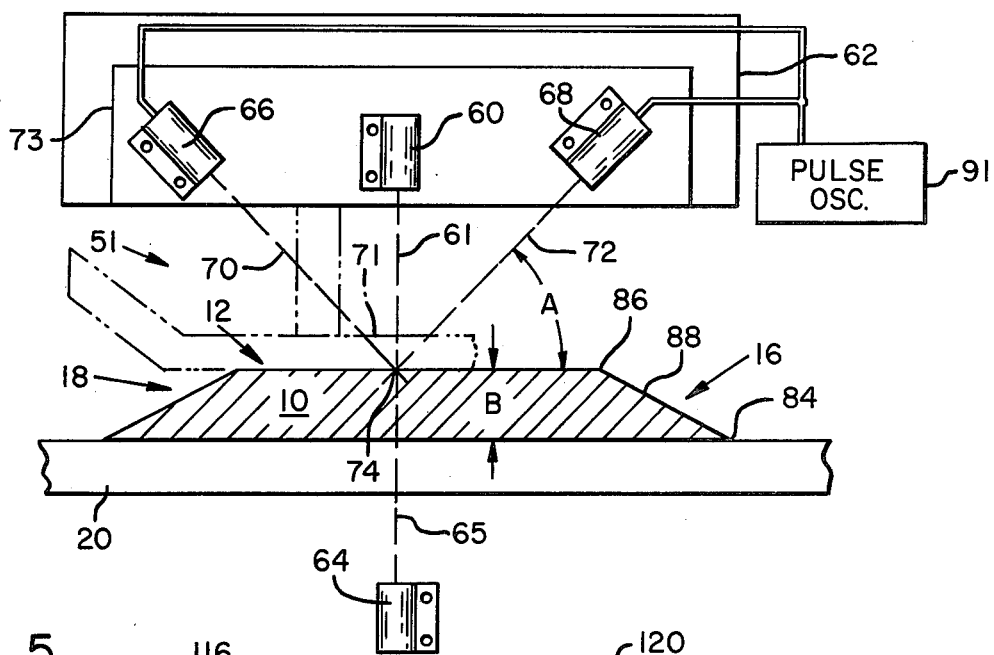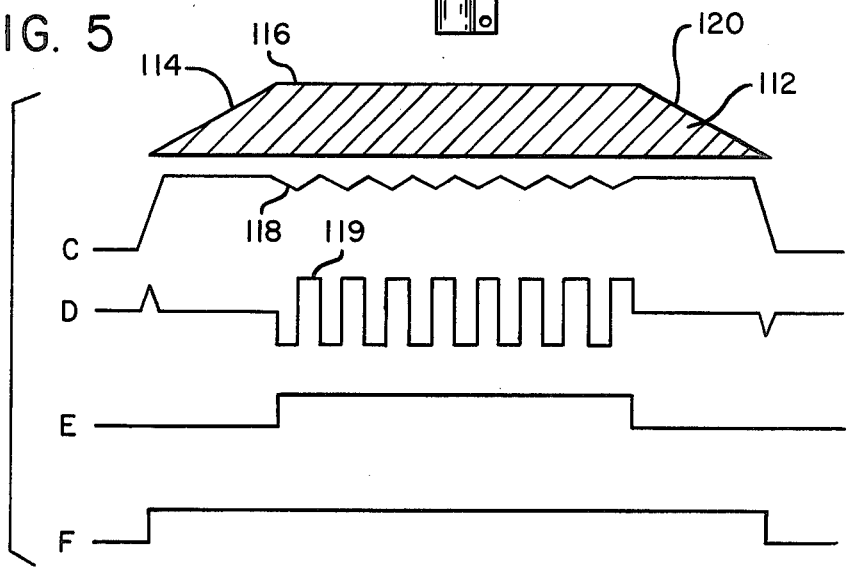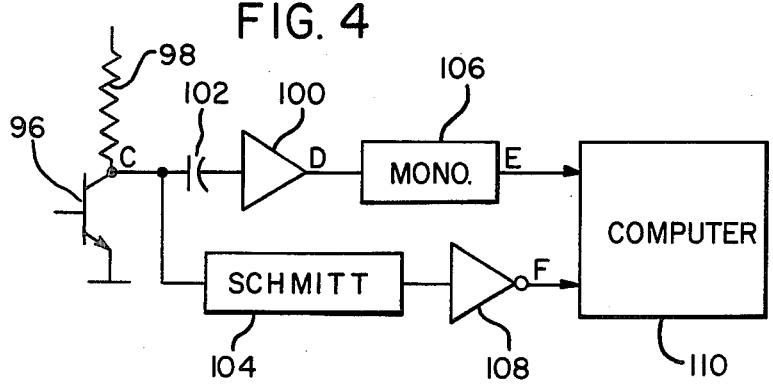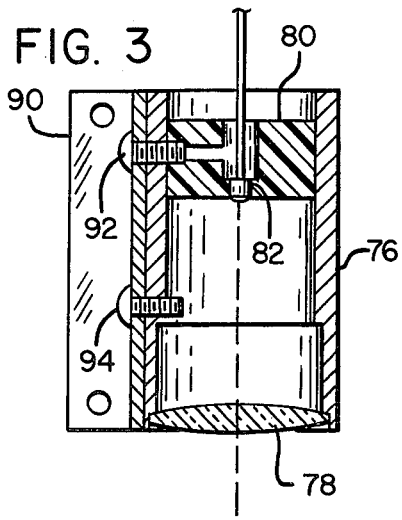

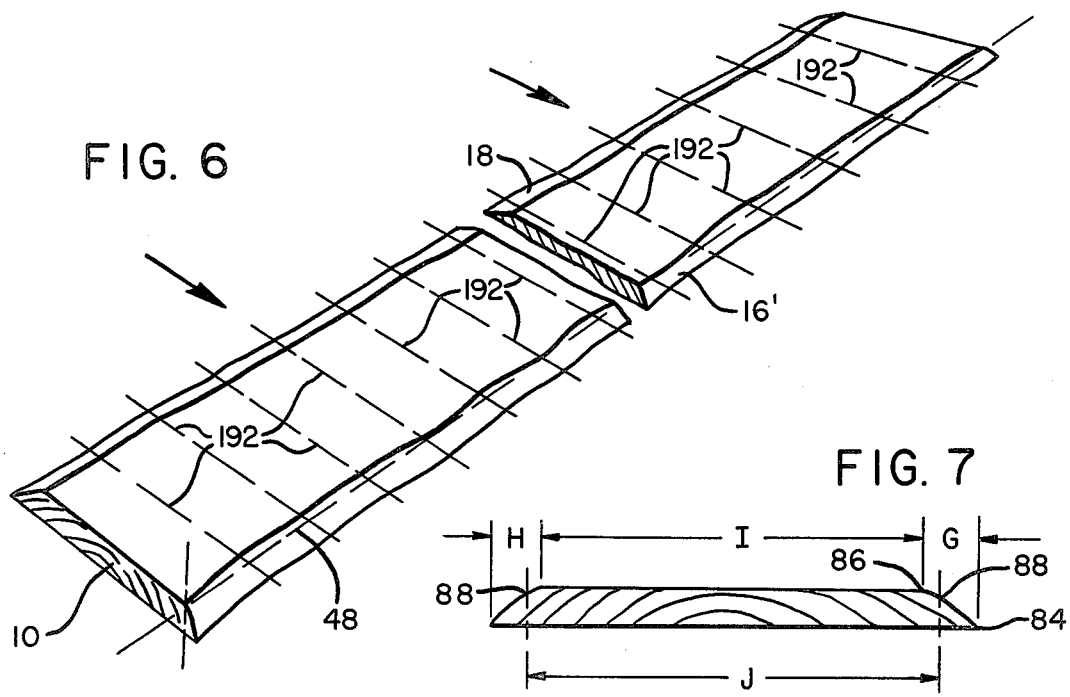
FIG. 6
FIG. 7
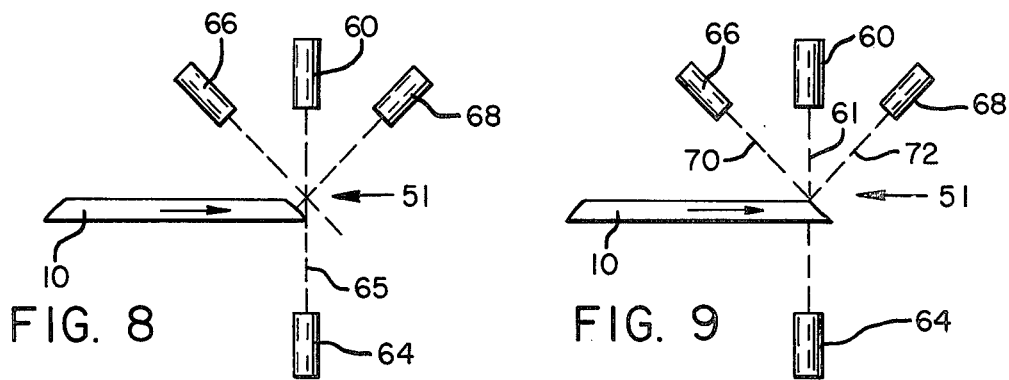
FIG. 8
FIG. 9
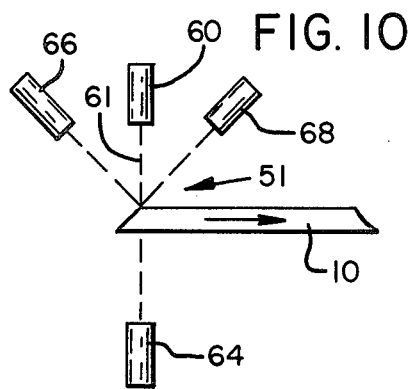
FIG. 10
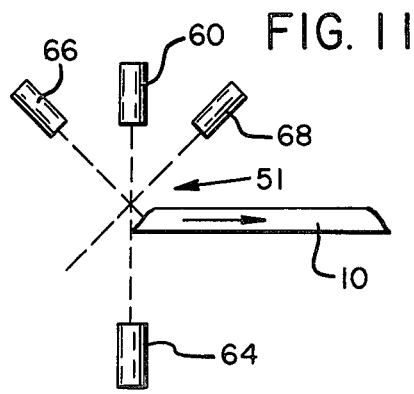
FIG. 11

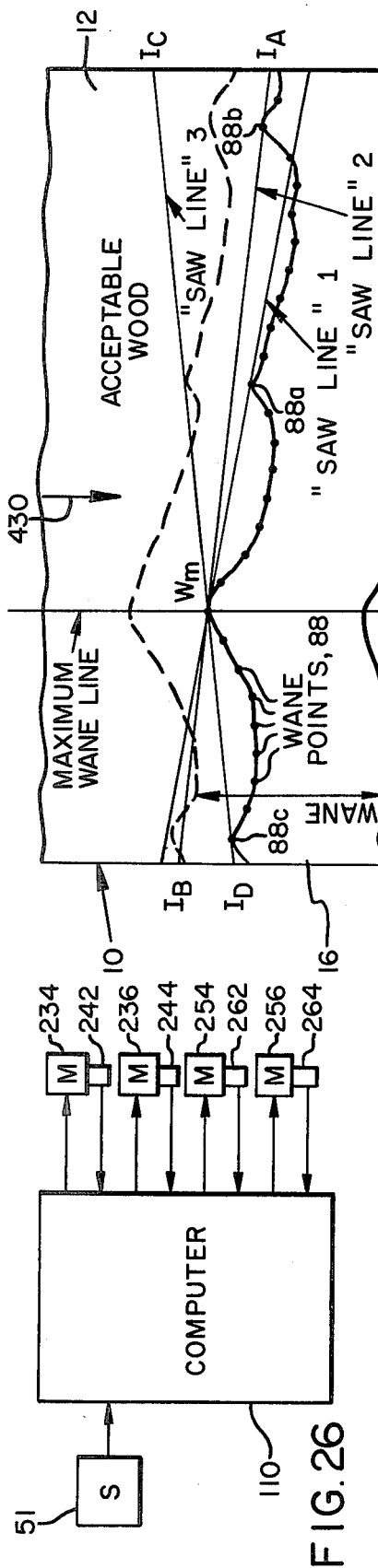
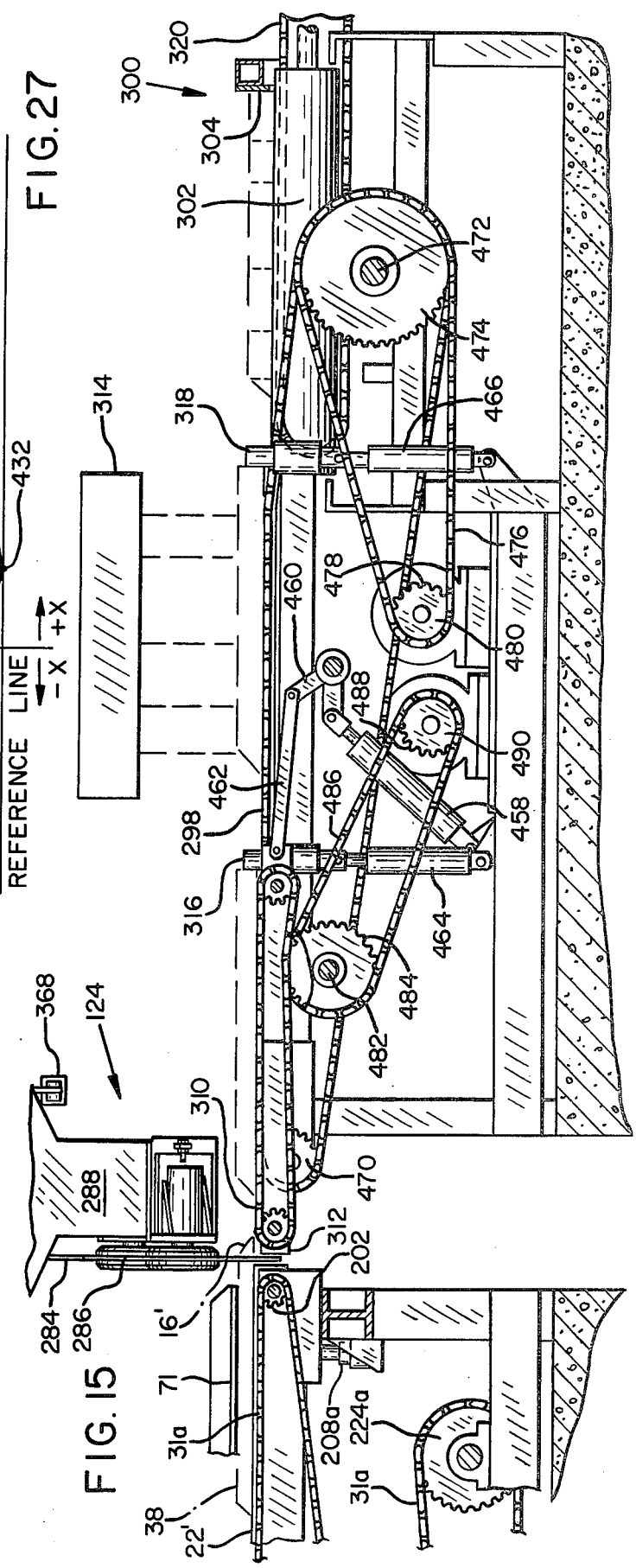

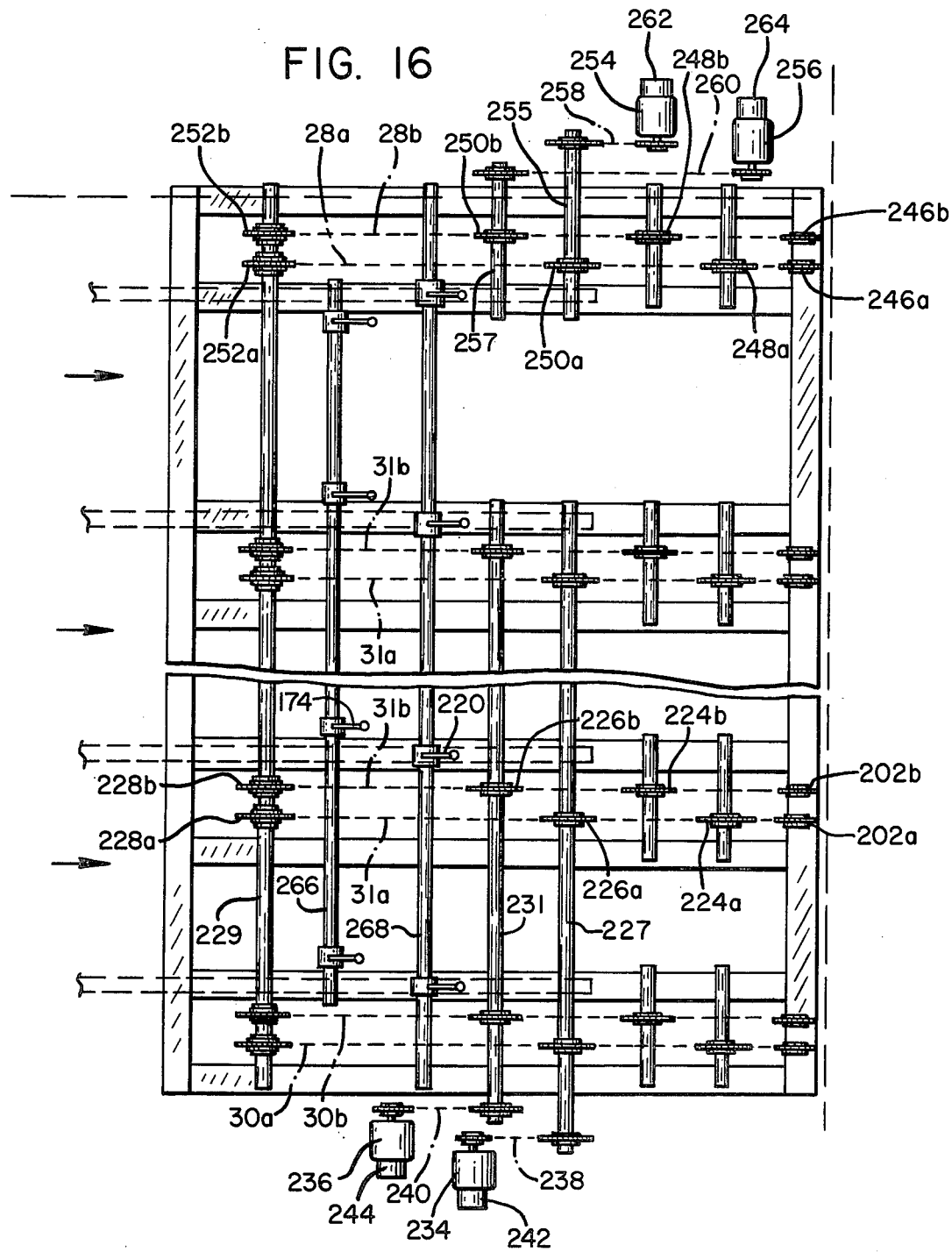

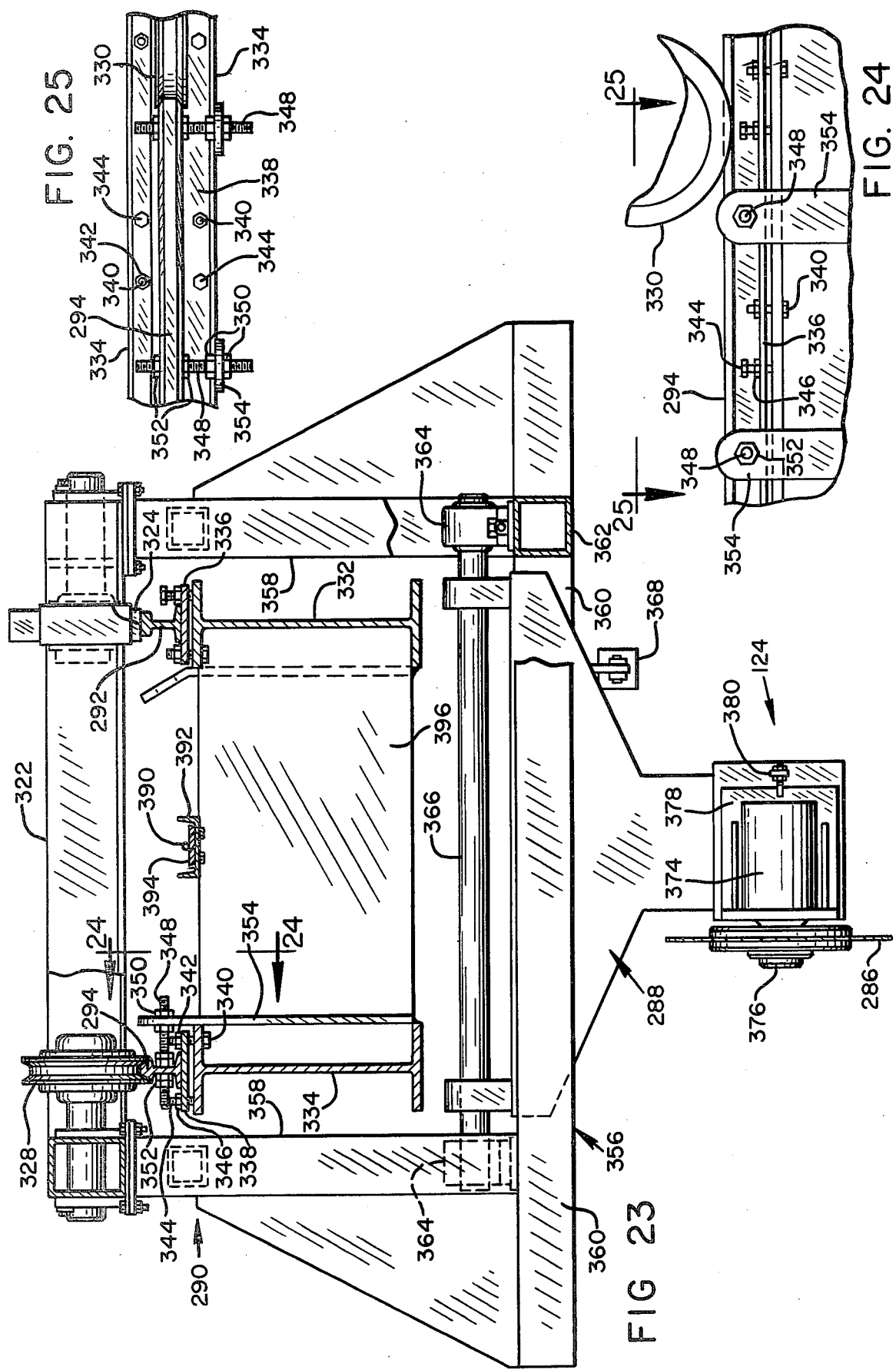

AUTOMATIC SAWMILL APPARATUS

BACKGROUND OF THE INVENTION

The present invention relates to an automatic sawmill and particularly to automatic sawmill apparatus for removing an irregular edge from a cant or board.

In automatic sawmill operation, a maximum recovery in board feet of lumber from incoming logs is desired, as well as high volume capacity for handling and cutting the maximum lumber in a given period of time. One problem associated with automatic sawmill operation is removal of the irregular lateral edge on a plank or a cant. For example, it is necessary to remove the wane edge on a plank or cant, i.e. the rounded or non-squared edge resulting when such plank or cant is sawn lengthways from a round log. The wane must be removed, within certain tolerance restrictions, before the plank or cant is processed into dimensioned lumber. Of course, the wane can be sawn from the cant after visual inspection or measurements by operating personnel, but this can be unnecessarily expensive and time consuming. Merely trimming all cants within certain dimensions to remove all possible wane areas would be unduly wasteful.

Automatic detectors for measuring uneven edges or wanes are known, but implementing the measurements derived therefrom for removing the undesired irregular edge or wane may be somewhat inaccurate. After detection, the plank or cant is frequently moved some considerable distance before sawing, and the correct orientation of the plank or cant relative to a saw used for removing the irregular edge can be difficult to maintain. Thus, in the course of measurement and removing of the undesired edge, the cooperation of two conveyor systems is often required, i.e., one to orient the cant for correct sawing, and a second conveyor, usually operated in perpendicular relation to the first, for moving the cant lengthways through a stationary saw. Cumulative errors can result requiring in effect the removal of more of the edge than would really be necessary, or resulting in a slowdown in the handling capacity of the apparatus for the sake of greater accuracy.

SUMMARY OF THE INVENTION

According to an embodiment of the present invention, an automatic sawmill apparatus includes a conveyor means for moving a plank or cant laterally with its irregular or wane edge in leading position. A detector positioned along the conveyor means detects the irregular forward edge or wane and directs movement of the conveyor means to orient the plank or cant, e.g. angularly if necessary, relative to a fixed saw line. The conveyor means holds the plank or cant in predetermined position, while a power saw carriage moves longitudinally along the predetermined saw line for accurately removing the irregular forward edge or wane. In a preferred embodiment, the saw carriage moves forwardly and backwardly across the conveyor means for removing the wane edge of successive cants, and in particular includes a pivoting saw mechanism having a pair of blades rotating in opposite directions and successively movable downwardly to intercept a cant.

Further, in a preferred embodiment, the conveyor means comprise pairs of chains for engaging cants in accordance with the length measurements thereof, wherein individual conveyors of each pair operate alternatively for engaging successive cants.

Further in accordance with a preferred embodiment, the apparatus includes first "even ending" means for receiving cants and propelling the same toward an aligning stop, second means for individually receiving the cants and moving them laterally with the irregular edge in leading position, pin stops along the second means spaced farther apart than the width of a said cant and operable for spacing the cants, conveyor means for receiving the cants and controlled by measuring scanners for orienting the same, clamping means for holding a measured cant, and a saw movable across the path of the cants for sawing irregular measured forward edges thereof as the cant is held in position by the clamping means. After removing the forward edge of the cant, the same is suitably moved forwardly to an index position determined along the newly sawn lateral edge, and the same is propelled lengthways into an edger having a plurality of saws for cutting the cant to desired width. The scanners suitably also control this edger in accordance with the measured width of the cant from the sawn forward edge.

Also, in accordance with a preferred embodiment, the orientation of the cant for removing of the irregular forward edge is determined by determining a computed saw line as will substantially intersect a pair of most deeply indented wane points on the forward edge, as long as other wane points are not within the computed saw line. If such other wane points are within the saw line, the computed saw line is redetermined with respect to such other wane points. The computed saw line is substantially tangent to a wane point curve at two locations. The cant or plank is moved forwardly causing the computed saw line to coincide with the actual saw line executed by the movement of the carriage saw.

It is accordingly an object of the present invention to provide an improved automatic sawmill for removing an irregular lateral edge from a plank or cant.

It is a further object of the present invention to provide an improved automatic sawmill of optimum capacity which accurately removes the irregular lateral edge from a plank or cant.

It is another object of the present invention to provide an improved automatic sawmill for cutting planks or cants into widths in a manner for achieving the optimum lumber output and decreasing waste.

It is another object of the present invention to provide an improved automatic sawmill wherein the irregular forward edge of a plank or cant is automatically measured, and wherein relatively small additional movement of the plank or cant brings the same to a fixed position for sawing with a movable saw.

The subject matter which we regard as our invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 2 is a side view of a scanner suitably employed with the FIG. 1 apparatus;

FIG. 3 is a longitudinal cross section of a radiation source or detector as employed in such a scanner;

FIG. 4 is a schematic diagram of circuitry for receiving the output signal from the detector;

FIG. 5 is a waveform chart illustrating operation of the FIG. 4 circuit;

FIG. 6 illustrates scans across a cant for the purpose of removing an irregular edge or wane thereof;

FIG. 7 is a cross-sectional view of the FIG. 6 cant;

FIGS. 8 through 11 illustrate successive positions of a cant passing through a wane detector or scanner;

FIG. 15 is a partially cut away cross-sectional side view principally illustrating output conveyor means of the apparatus according to the present invention;

FIG. 16 is a cross-sectional plan view principally illustrating drive means for the orienting conveyor means of FIG. 14;

Figure 19:
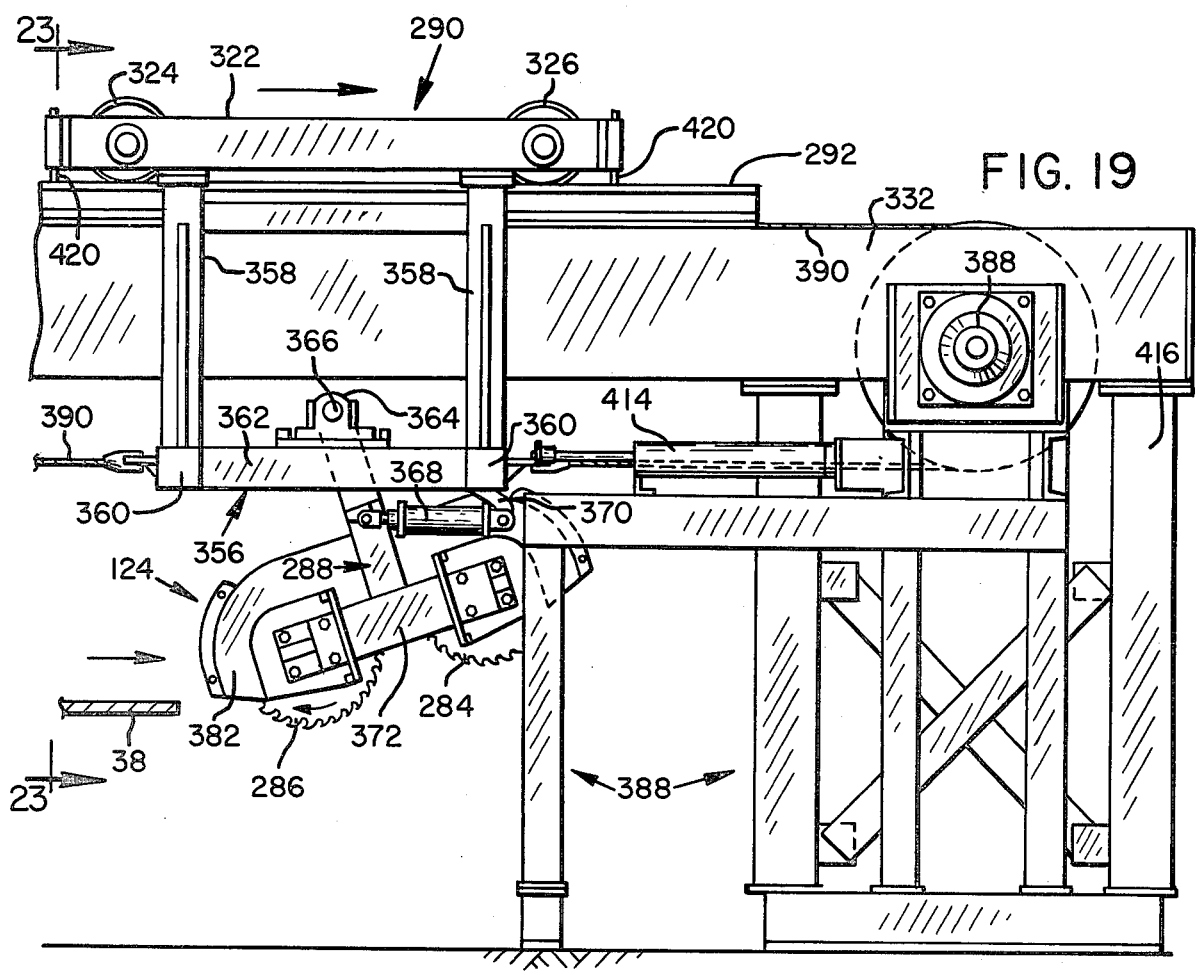
FIG. 19 is a partially broken away side view of a movable saw according to the present invention, including support at a first end thereof.
Figure 22:
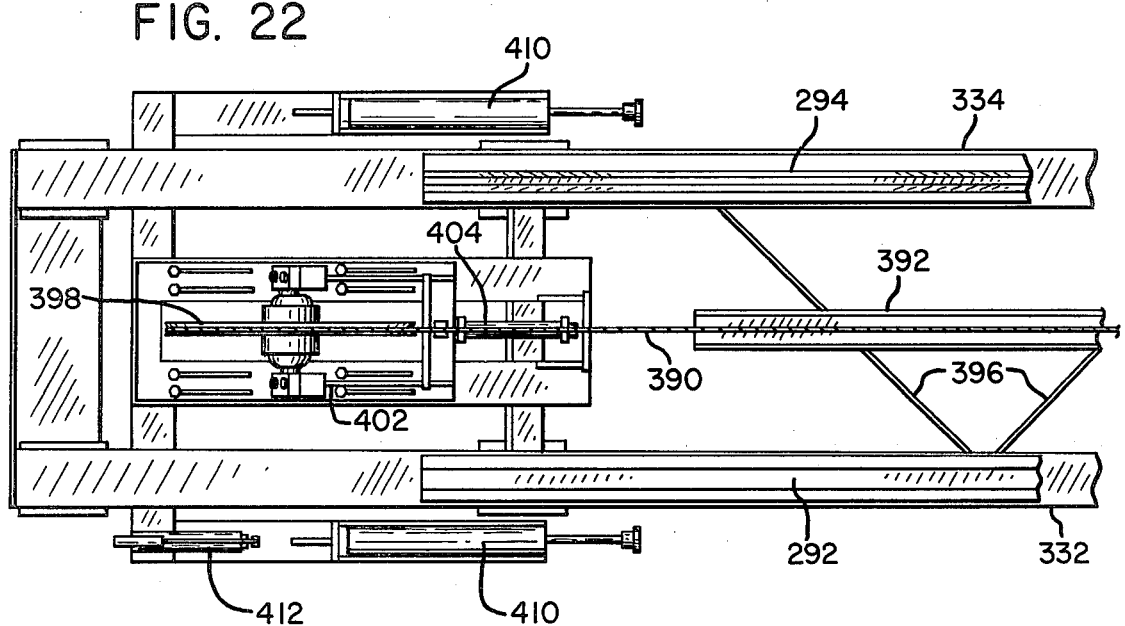
FIG. 22 is a plan view of the FIG. 21 support.
Figure 21:
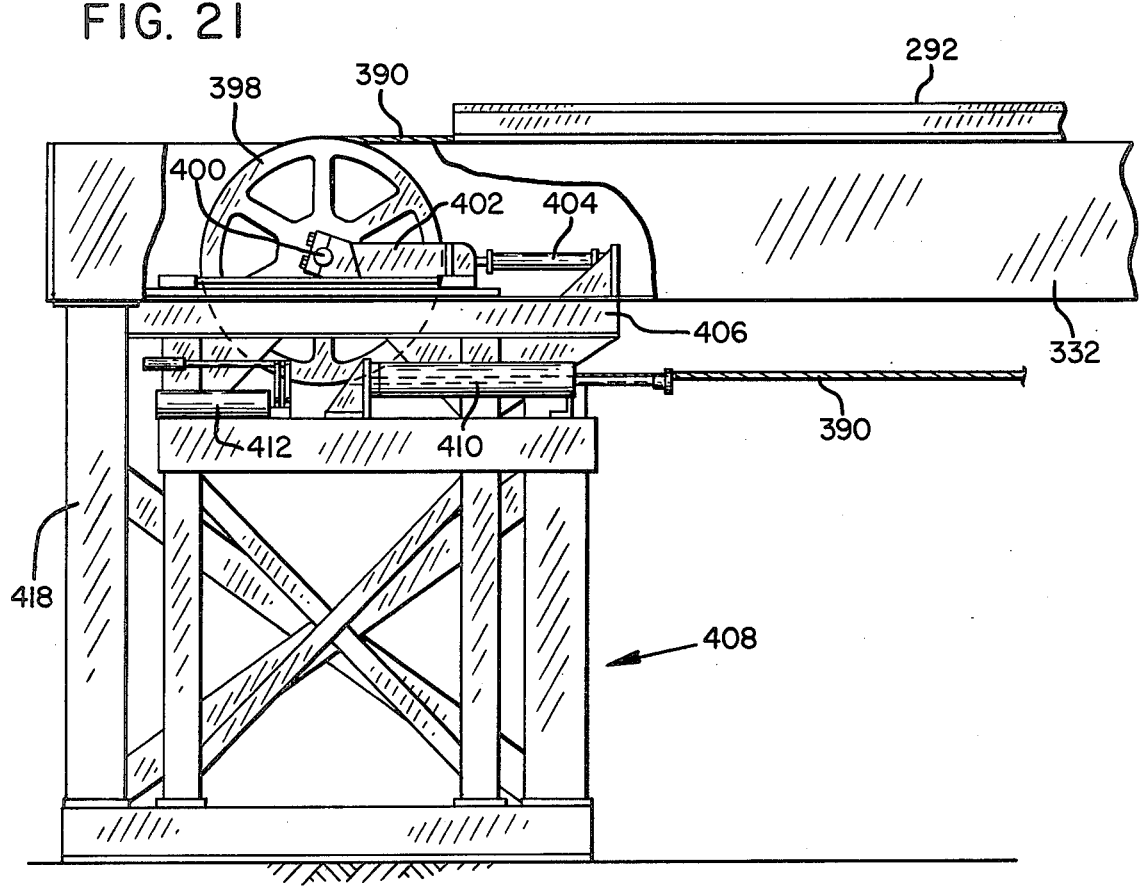
FIG. 21 is a partially broken away side view of an opposite end support for the saw.

FIG. 23 further illustrates the movable saw according to the present invention as viewed at 23—23 in FIG. 19;

FIG. 24 is a fragmentary view of rail means as taken at 24—24 in FIG. 23;

FIG. 25 is a further view of such rail means as taken at 25—25 in FIG. 24;

FIG. 26 is a block diagram of a computer system as may be employed with the present invention;

FIG. 27 is a diagram illustrating computer operation; and

Figure 28:
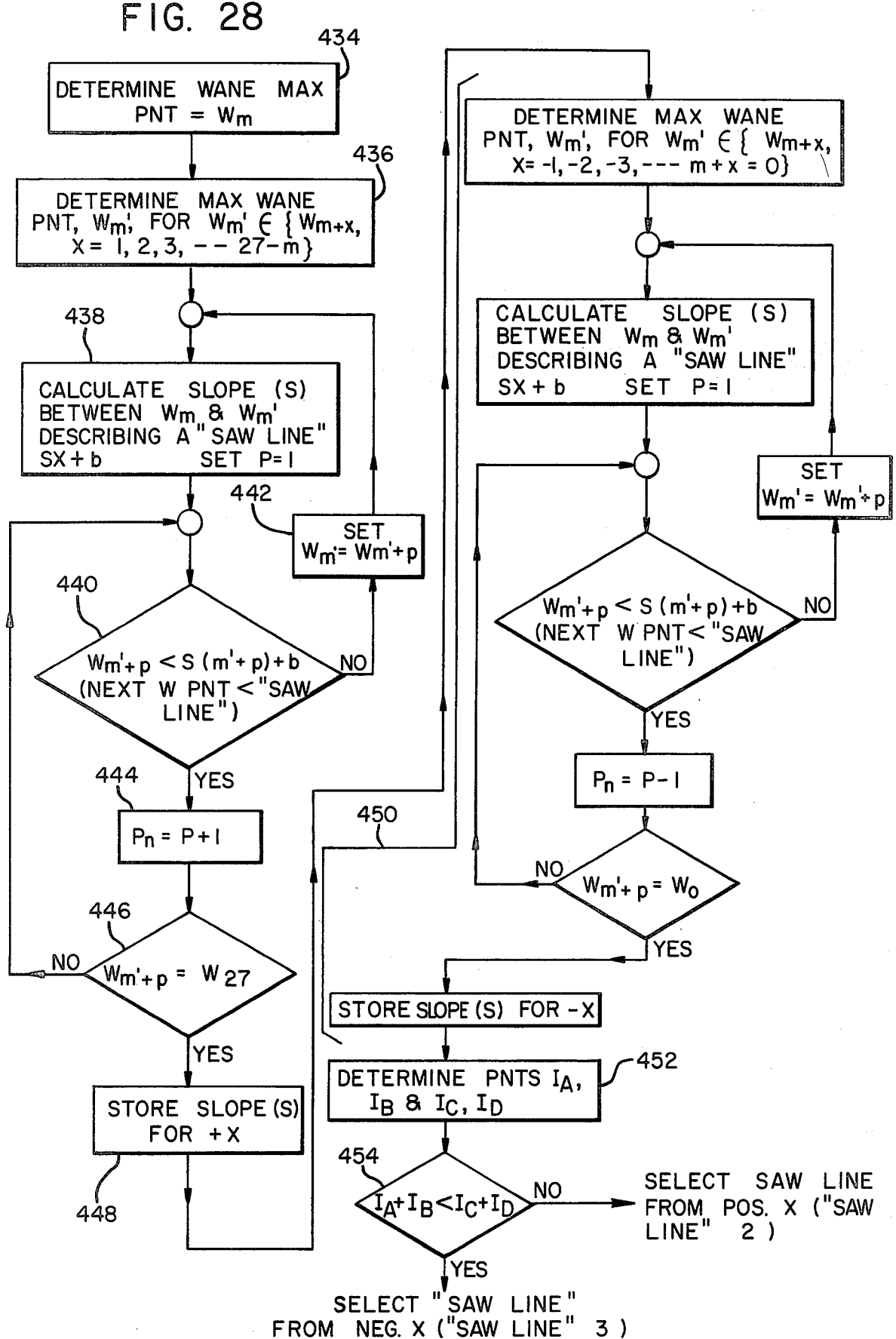

FIG. 28 is a flow chart illustrating computer operation for determining a calculated saw line.

DETAILED DESCRIPTION

Figure 1:
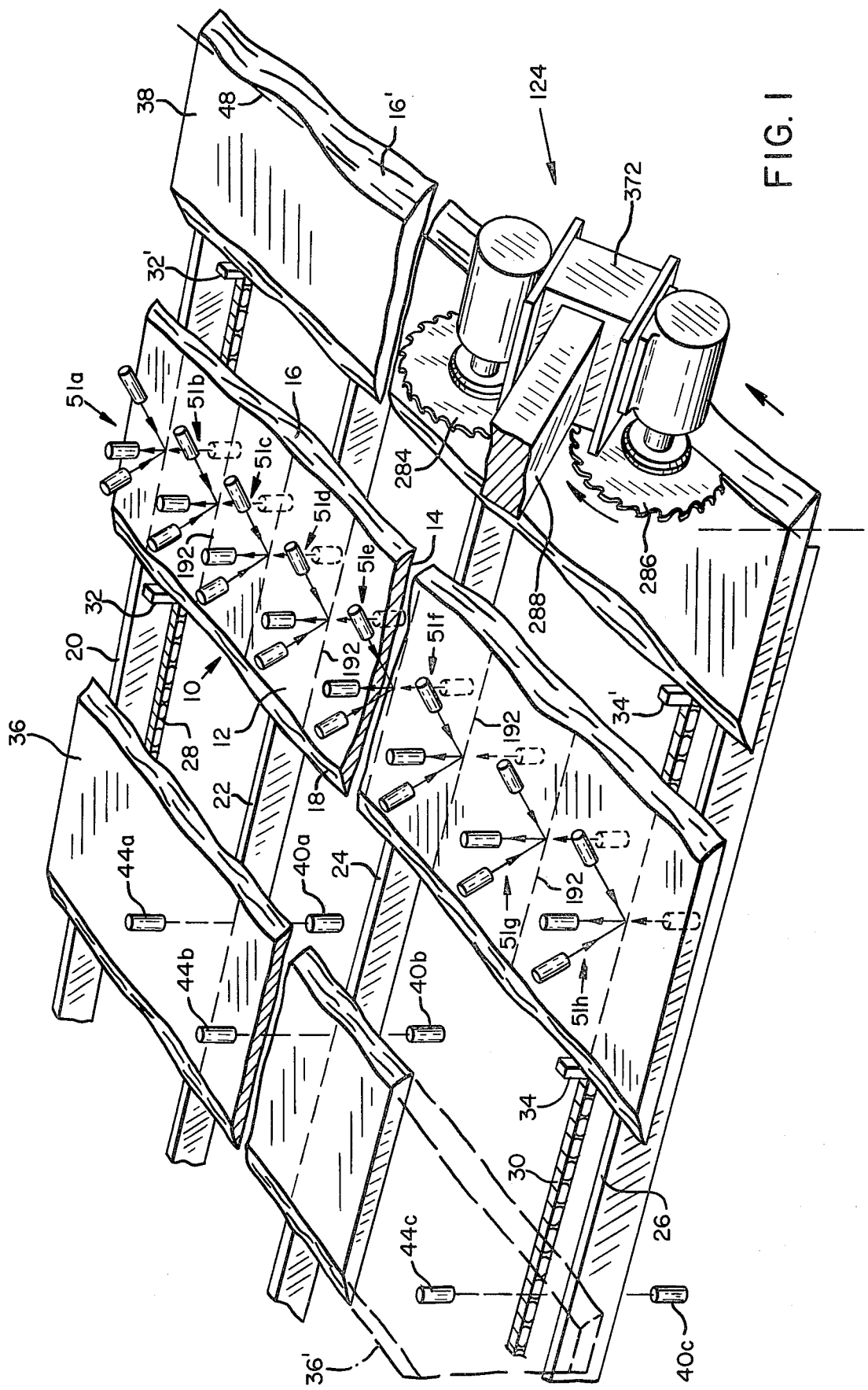
FIG. 1 is a perspective view in somewhat schematic fashion illustrating principal portions of an automatic sawmill according to the present invention.

Referring to the drawings and particularly to FIG. 1, illustrating portions of a sawmill according to the present invention in somewhat schematic fashion, a cant 10 sawn from a round log has a substantially uniform thickness between upper surface 12 and lower surface 14, but is characterized by sloping or beveled forward and rearward edges, 16 and 18 respectively. The forward and rearward edges or wanes correspond to the outer periphery of the log from which the cant is obtained. The cant is disposed with its wanes facing upwardly upon a conveying system comprising rails 20, 22, 24 and 26 upon which it is moved laterally to the right, with the irregular wane edge forward, by means of chains 28 and 30 carrying cant engaging lugs 32 and 34. Other chains are suitably disposed in between chains 28 and 30 but only two are shown for clarity of illustration. Other cants are illustrated at 36 and 38, and illustrate a previous and subsequent position of cant 10 as it moves along the conveyor system.

Cant 36, in the course of its movement to the right, interrupts light beams provided by light sources 40a–40c directed toward photocells or photo-diodes 44a–44c for determining the length of the cant. Cant 36 is illustrated as somewhat foreshortened and would therefore interrupt light beams from light sources 40a and 40b, but not 40c. Consequently, a conveyor 28 would be activated along with an intermediately positioned conveyor (not shown) for moving the cant. However, when the cant has a length as illustrated at 36', conveyors 28 and 30 will be operative.

Cant 10 in FIG. 1 is scanned by an array of scanners. A preferred type of scanner is further disclosed and claimed in the copending application of Carl W. Maxey, Ser. No. 916,596, filed June 19, 1987, entitled "Automatic Wane Detector." The individual scanners are numbered 51a through 51h. The individual scanners are suitably disposed at one foot intervals along the cant. They are employed for detecting irregularities along the lateral edge of the cant, e.g. for determining the location and extent of the wane 16 at the forward edge of the cant, and for determining the available wood between wane 16 and rearward wane 18. One such scanner, numbered 51a, will be described in greater detail with reference to FIG. 2, it being understood that each of the other scanners can be substantially identical in construction and operation.

Referring particulary to FIG. 2, illustrating a scanner 51 in greater detail, an electromagnetic radiation detector 60 is mounted upon a support beam 62 disposed above the conveyor system of FIG. 1 so the radiation detector is oriented to receive radiation in a vertically upward direction. Beam 62 mounts detector 60 above the level of rail 20 and cant 10 as the latter moves from left to right through the region of scanner 51. An electromagnetic radiation source 64 is mounted, by means not shown in this figure, underneath the level of rail 20 and directs radiation 65 vertically upward in direct alignment with the detection path 61 of detector 60. Consequently, detector 60 normally receives radiation from source 64 and provides a corresponding signal output, except when a cant such as cant 10 is interposed therebetween in the manner illustrated in FIG. 2.

Second and third electromagnetic radiation sources, 66 and 68 respectively, are also mounted on beam 62 and provide narrow radiation beams 70 and 72 directed angularly downwardly, both at an angle A with respect to the horizontal top surface 12 of cant 10. Angle A is suitably 45 degrees. Source 68 is angularly forward of detector 60 and source 66 is angularly rearward thereof along the direction of conveyor travel. Both sources 66 and 68 are located so that the beams 70 and 72 intersect at a point 74 directly below detector 60 in the narrowly focused detection path thereof, so long as dimension B, the thickness of cant 12 above rail 20, has a predetermined value. Thus, if cants have been produced in a sawing operation designed to provide two-inch lumber, dimension B would be a standard two inches or the customary thickness in the trade for such lumber. If beams 70 and 72 intersect at point 74, having the distance B above rail 20, then detector 60 can respond to the radiation reflected from point 74. However, the detector will be substantially non-responsive to radiation reflection from any other cant thickness, since the beams 70 and 72 will not reach the top surface of the cant directly below detector 60 in the narrow detection path 61 thereof. It is noted that for the prescribed thickness B, the radiation from beams 70 and 72 reinforce one another or have double intensity at point 74, and result in an enhanced output from detector 60. Also, since two sources are employed, i.e., forward and behind the detector, any tendency for the cant surface to reflect radiation in a directional manner, due to roughness or rotation along its long axis, can be canceled out. Also, mechanical alignment problems are lessened in employing this wane detector configuration.

One or more hold down shoes 71 as illustrated in FIG. 2 may be employed for insuring cant 10 is urged downwardly against conveyor system rails, for example rail 20, to insure an accurate indication is given relative to thickness levels of the cant, and for other purposes as will hereinafter appear. The hold down shoes are fixed in relation to beam 62 and urge the cant downward as it passes thereunder.

Referring to FIG. 3, a construction is illustrated which is applicable to sources 64, 66 and 68, as well as to detector 60. In each case, this construction includes a cylindrical metal shell 76 provided at its open end with a lens 78, suitably having a twenty-five millimeter diameter. Rearward of the lens within shell 76 is positioned a plexiglass support plug 80 for centrally locating a radiation device 82, which in the case of radiation sources preferably comprises an infrared emitter, and which preferably comprises an infrared sensitive photo-diode in the instance of the detector. The device 82 is so located with respect to the lens 78 that a small spot or image is focused at point 74 in the case of sources 66 and 68. A one-sixteenth to one-eighth inch diameter spot is focused at point 74 on the top surface 12 of cant 10 by either source 66 or 68 in a typical case. Source 64 and detector 60 are also focused at point 74. The shell 76 is secured to an L-shaped mounting bracket 90 by means of screws 92 and 94. The mounting bracket is in turn employed to secure the structure to beam 62, or to understructure in the case of source 64.

It will be observed that detector 60 together with sources 66 and 68 are mounted upon the same support beam 62, which results in continued accuracy of spot focusing and detector output after the devices are once mounted. In fact, the detector 60 and the sources 66, 68 are mounted on beam 62 as a unit employing a single enclosure or sub-support 63. Then the individual units 60, 66, 68 need not be adjusted relative to one another, but only the common sub-support need be properly positioned on beam 62 such that focus point 74 will occur at the exact top surface for cants being detected.

A principal purpose of scanner 51 is to ascertain the location and extent of wane, e.g., leading wane 16, at the forward edge of the cant as the cant moves from left to right. The scanner will provide information regarding the beginning of the wane defined as wood point 84 in FIG. 2, the end of the wane where the wane intersects top surface 12 which will be called the acceptable wood point 86, and by proportion, an intermediate point 88 which may be termed the wane point. This will be understood to be the sawing location which would leave a small amount of wane on the resulting board, but which is nonetheless acceptable according to garding rules. Grading rules may allow, for example, a wane tolerance equaling one-third the depth of the piece.

Assuming the wane is substantially flat, the wane point 88 would then be one-third of the distance from point 86 to point 84, and the component of this distance in the horizontal direction would also be a proportional one-third of the horizontal extent of the wane. Of course, the wane is somewhat rounded, but these dimensions are given by way of example.

The radiation sources are energized in a conventional manner by a source of electrical energy. However, sources 66 and 68 are pulsed. In the present example, the period of pulsation is 0.4 milliseconds provided by pulse oscillator 91 in FIG. 2. The output of detector 60, and specifically the infrared photo-diode thereof, is suitably connected to the base of an amplifying transistor 96 in FIG. 4, the emitter of the transistor being grounded and the collector thereof being returned to a source of positive voltage through resistor 98. The collector of transistor 96 is further coupled to the input of amplifier 100 via capacitor 102, and is also coupled to the input of a Schmitt trigger circuit 104. The output of amplifier 100 is applied to monostable multivibrator 106 which supplies a first output for the circuit. The output of Schmitt trigger circuit 104 is coupled via inverter 108 to provide a second output. Both such outputs are suitably coupled to a computer or saw-control 110 which directs sawing of the cant to remove or substantially remove the detected wane portion of the cant.

Operation of the scanner including the construction shown in FIG. 2 as well as the circuit of FIG. 4 will be described with respect to the explanatory diagrams of FIGS. 5 through 11. FIG. 5 comprises a waveform chart indicative of voltage levels occurring in FIG. 4 circuit in response to detection of a cant schematically illustrated at 112. It will be appreciated the orientation of a cant 112 is for waveform reference only and does not necessarily indicate the direction of passage of a cant through the scanner.

The waveforms present at correspondingly lettered points in the FIG. 4 circuit are illustrated in FIG. 5. The waveforms illustrate the response of the circuit as the scanner scans portions of the cant corresponding to cant 112 illustrated immediately thereabove. Each of the waveforms initially has a ground or reference level as radiation source illuminates detector 60, thereby operating Schmitt trigger circuit 104. The high output of trigger circuit 104 is inverted by inverter 108 to provide a reference level for waveform F. The threshold of operation of Schmitt trigger circuit 104 is such that an output from detector 60 is indicative of direct illumination from source 64 is required to operate Schmitt trigger 104. Then, when an edge of the cant is interposed between source 64 and detector 60, the Schmitt trigger 104 is no longer operated, whereby its output goes low and the output of inverter 108 rises, producing waveform F. As the wane 114 becomes interposed between the radiation source and the detector, the output C of transistor 96 remains at a substantially high level, insufficient for operating the Schmitt trigger circuit 104. When the radiation beams from sources 66 and 68 strike the top surface 116 of cant 112, radiation is reflected into detector 60, but this radiation is an order of magnitude less than directly received radiation, and accordingly produces a relatively small variation in the output C of transistor 96. This AC waveform portion 118 results from the fact that light sources 66 and 68 are pulsed as hereinbefore mentioned. The variation is insufficient to change the status of Schmitt trigger circuit 104. However, the AC component is coupled via capacitor 102 to amplifier 100 which is driven into saturation by such waveform, producing a squared-up resultant illustrated at 119 in FIG. 5. The waveform portion 119 has the 0.4 millisecond repetition period of sources 66 and 68.

The waveform D is coupled to monostable multivibrator 106 which has an 0.5 millisecond time constant or is designed to remain in the triggered state for 0.5 milliseconds. Therefore, the faster repetition input D effectively keeps the monostable multivibrator triggered for as long as the acceptable wood surface 116 provides the AC component in the detector output. Consequently, an output pulse E is provided for monostable multivibrator 106 until the scanner encounters wane 120. At this time, waveform E drops low, but output F remains up until the edge of the cant is reached and detector 60 once more receives direct radiation for operating Schmitt trigger circuit 104. It will also be appreciated the waveform representation of FIG. 5 is by way of illustration of relative positioning, and actual waveform portions 118 and 119 have a much higher frequency than would be indicated from the drawing.

The operation of the scanner is more fully illustrated in FIGS. 8 through 11. As cant 10 in FIG. 8 interrupts beam 65 directly illuminating detector 60, waveform F rises as hereinbefore described. Then as the forward top corner or the acceptable wood point reaches a location directly in line with path 61 of detector 60 in FIG. 9, the waveform E rises. At this point, assuming cant 10 has the prescribed thickness, the radiation beams 70 and 72 intersect mutually with the detector path 61 at precisely the plane of the acceptable wood surface such that the output E is produced. The same combination of outputs continues until the cant 10 reaches the position illustrated in FIG. 10, wherein waveform E goes low as the trailing wane becomes aligned with detector path 61. Then, as the cant 10 passes out from between source 64 and detector 60 in FIG. 11, waveform F also goes low. The wanes are detected as the areas which provide waveform F without waveform E.

As the cant 10 moves through a plurality of scanners in the direction indicated by the arrow in FIG. 6, information is acquired as to the width of the cant and the extent of the wane on the trailing and leading edges for a plurality of scans 192 across the cant. Thus, referring to FIG. 7, for each of the scans a possible acceptable wood width I is defined with a leading wane G and a trailing wane H. Permitting allowable wane tolerance for the board, a width J may be secured between wane points 88.

As the cant is moved further to the right to the position of cant 38 in FIG. 1, the information derived from the scanners is conveniently stored by conventional memory means in computer 110 in FIG. 4 receiving the E and F outputs of the respective scanners. Information is stored until the cant moves from under the scanners to the position of cant 38, intersecting a saw line 48. The computer is, of course, responsive to the extent of conveyor movement or may determine the same as hereinafter more fully described. According to one mode of determining the relative position of the wood and the saw line, the cant is moved forwardly until such saw line intersects the innermost or last occurring acceptable wood point. The wane would thus be severed at a point where it most deeply indents the leading edge of the cant. Alternatively, a saw line can be established coincident with the innermost or last occurring wane point 88, as illustrated in FIG. 7, with the proportionality being established by computer 110 between the wane point and acceptable wood point for the same scan. A second saw line can also be established along which the trailing wane can be severed according to the forward-most or first occurring acceptable wood point or wane point. Therefore, a board width I or J is defined which will effectively remove the wane portions. Instead of merely severing the trailing wane in the manner described, standard widths can be stored in computer 110, prescribing a saw line for the trailing edge of the board which will result in an integral number of two-by-fours, two-by-sixes, or the like.

Rather than intersecting the saw line with the most deeply indented acceptable wood point or wane point on the leading edge, the saw line may be made to correspond to plural acceptable wood points or wane points. That is, the cant may be angularly oriented by conveyors 28 and 30 via lugs at 32' and 34' so that the saw line will intersect said plural acceptable wood points or wane points. This mode of operation is hereinafter more fully considered.

After the cant 38 is finally positioned by means of lugs 32' and 34' on conveyors 28 and 30 so that selected wane points, for example, coincide with saw line 48, the movable saw 124 traverses along the longitudinal length of the cant to remove the irregular or wane edge therefrom. The saw 124 moves relative to a stationary cant which is held in position by chain lugs 32' and 34', and also by hold down shoes such as shoe 71, illustrated in FIG. 2, the latter suitably extending to contact the cant in position 38. The saw 124 includes counter-rotating saw blades 284 and 286 mounted on a support 372 at the lower end of pivoting frame 288. Frame 288 is pivotally supported from a carriage (not shown in FIG. 1) adapted to move the saw across the conveying system, longitudinally of the cant, so that saws 284 and 286 will saw precisely along the fixed saw line 48. As viewed in FIG. 1, frame 288 is pivoted such that saw 286 is in a wood-engaging position, while saw 284 is upraised from the wood. Saw 286 rotates in a clockwise direction (as viewed in FIG. 1) as the carriage carries the saw longitudinally of the cant in the direction shown by the arrow at the lower part of the drawing. When the saw has fully traversed the length of the cant and the wane 16' has been completely removed therefrom, a following cant will be positioned by the conveyor system at a location corresponding to cant 38 for removing its forward wane. Pivoting frame 288 will then swing the saw 124 such that blade 284 is lowered to engage the wood on a reverse pass on the same saw line 48, while saw 286 is upraised. Then, the saw is moved by its carriage in the reverse direction, from right to left as viewed in FIG. 1.

The saw moves at relatively high speed and separates the wane from the cant to leave a forward reference edge for further sawing, without requiring movement of the cant by additional conveyor means subsequent to cant measurement. Rather, the cant is accurately positioned and maintained at a stationary location with reference to the saw line 48 whereby accurate removal of the wane can be accomplished. After separation of the wane, the cant is moved forwardly on the conveyor system for further processing. The present system makes possible a high production output without sacrifice in accuracy of removing irregular cant edges, and without unnecessary waste of wood resources.

Considering the apparatus according to the present invention in greater detail, reference is made to FIGS. 12 through 18. Incoming cants are received on conveyor chains 156 carried by frame 158 and interspersed between live rolls 150 of a roller conveyor 148. The chains are raised by frame supporting hydraulic cylinders 160 for this purpose. After movement of the cant over the rolls 150, the frame 158 is lowered to the position shown and a cant will be urged to the left in FIG. 12 against stop 152 for "even ending" the cants or aligning the same with their left-hand ends indexed at a predetermined position. The cants are placed upon the conveyor with the wane side up, either manually or as received from an apparatus disclosed and claimed in the copending application of Aaron U. Jones, Ser. No. 886,879, filed Mar. 15, 1978, for "Board Separator." A portion of the latter apparatus is illustrated at 154 in FIG. 13A.

After even ending of the cants, the conveyor chains 156 are raised by means of hydraulic cylinders 160. The chains move the cant laterally forwardly in the direction of arrows 162 (in FIG. 12), with chains 156 being driven from a sprocket secured to shaft 164. However, a cant is ordinarily restrained from moving farther forwardly by stops 166 until these stops are hydraulically lowered for passing the cant on to a second set of conveyors, 168, illustrated partly in FIG. 13A and partly in FIG. 13B which is an extension of FIG. 13A. There are seven such conveyors which are suitably spaced laterally at four foot intervals. These conveyors are operated substantially continuously and therefore tend to move the cant farther in the direction of arrows 162, but continuous movement is prevented by the interposition of a plurality of hydraulically operated stops 170 located along each conveyor. The stops are spaced farther than the expected cant width. In operation, a single cant will be located next to each stop toward which it is urged by conveyor movement. Then, all the stops 170 are suitably lowered for allowing a particular cant to progress to a point between the next set of stops.

The various stops 170 are operated by hydraulic cylinders 172 via double armed levers 174 joined to the stops by means of links 176 each having a length appropriate to reach the stop. It will be observed the conveyor moves a cant 10 upwardly to the right in FIG. 14 with the conveyor chains moving up support 178. Each of the conveyor chains 168 returns underneath support 178, passing reversely around sprockets 180 and 182. A channel 190 returns the lower chain in each case to the beginning end of the conveyor.

Conveyor chains 168 deliver the cant to a third set of chain conveyors 28 and 30 on each side of the apparatus together with chain conveyors 31 interspersed therebetween. (See FIG. 14, extending FIG. 13B). Each of these chain conveyors actually comprises a pair of chains, e.g., chains 28a and 28b in the case of chain conveyor 28, chains 30a and 30b in the case of chain conveyor 30, and chains 31a and 31b in the case of each chain conveyor 31. As viewed in FIG. 12, each of the chain conveyors 30 and 31 is located immediately to the right of a conveyor chain 168 from which it receives a cant, while the "even end" or "zero reference" chain conveyor 28 is located immediately to the left of its corresponding conveyor chain 168.

Conveyor chains 168, where they deliver the cant to conveyors 28, 30, 31 each pass around a sprocket on the forward end of an arm 194 pivoted at 196 and comprising an extension of support 178. At the movable end of each arm 194 is located an upwardly projecting dog 198 which, in the upraised position shown at 198', prevents forward movement of a cant at location 36. However, in the lowered position of arm 194, a cant 36 is allowed to pass forwardly to the right in FIG. 14. Each arm 194 is normally upraised and is operated by detection of the interruption of light beams from sources 40 by photocells or photo-diodes 44 positioned on crossbeam 200. As hereinbefore indicated, there are a plurality of such light sources 40 and light detectors 44, and in particular a light source and detector are located adjacent each conveyor chain 168 and proximate dog 198. The light source 40, detector 44 combination performs the additional function of measuring the length of the cant from the zero reference level at the left in FIG. 12 and determines which of the chain conveyors 30, 31, will be functional in addition to chain conveyor 28, for removing the cant forwardly after arm 194 has lowered. Thus, only one of the conveyors 30, 31 will be operated in addition to conveyor 28, in response to the length of the cant. Arm 194 is raised and lowered by hydraulic cylinder 218 which turns double armed lever 220 for raising and lowering link 222.

Figure 17:
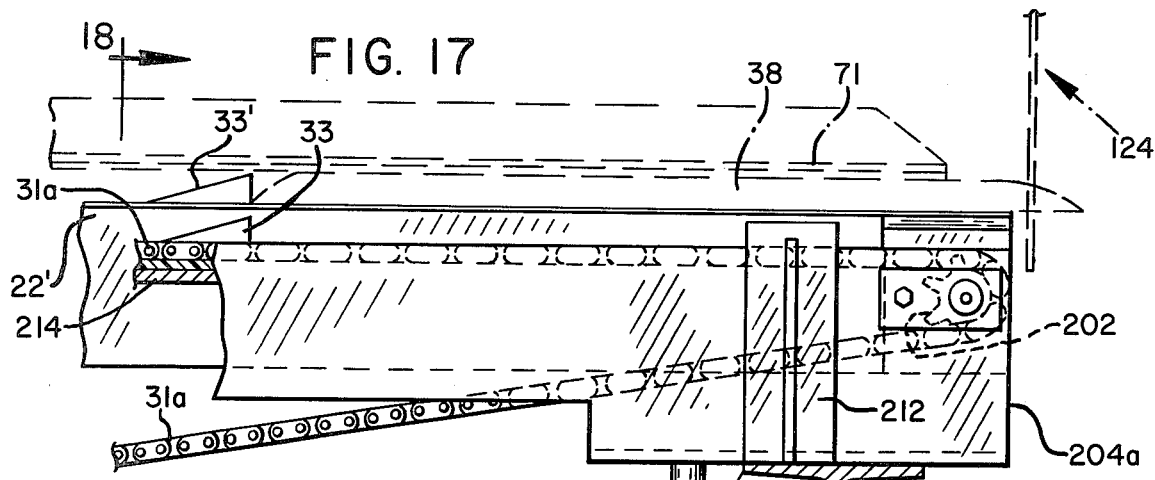
FIG. 17 is a broken away cross-sectional view illustrating vertical positioning means for the aforementioned orienting conveyor.
Figure 18:
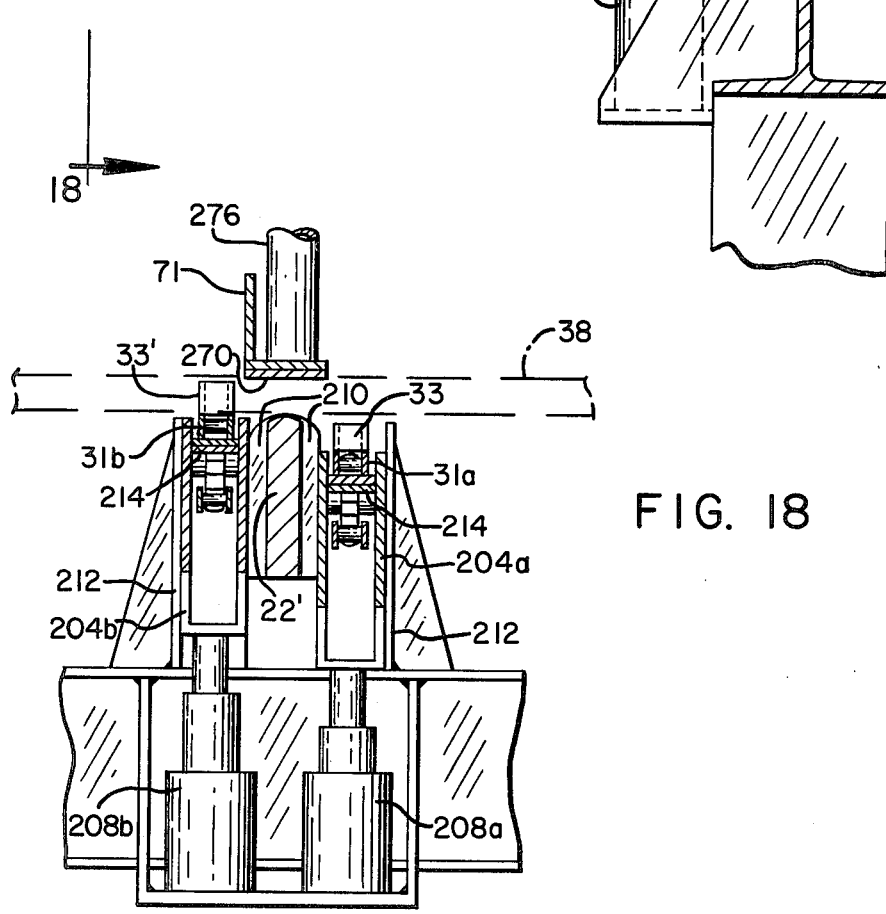
FIG. 18 is a partially broken away cross-sectional view taken at 18—18 in FIG. 17.
Figure 20:
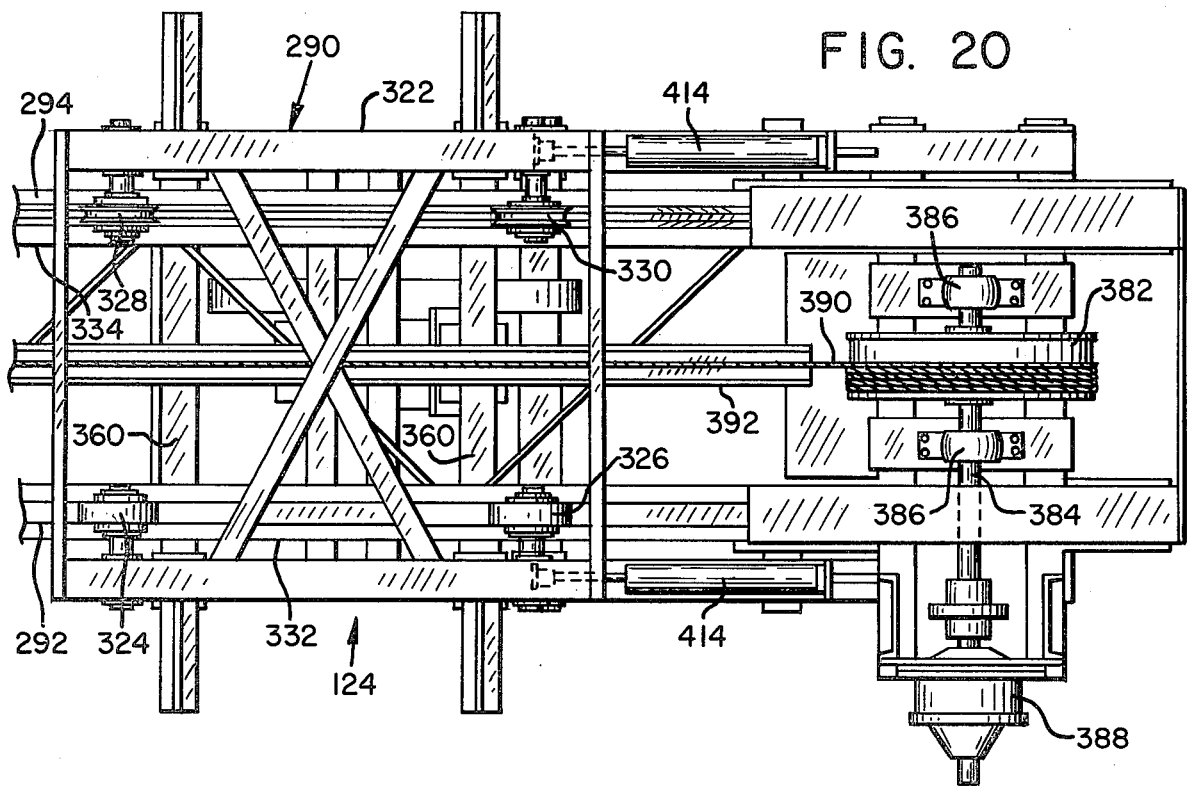
FIG. 20 is a plan view of the FIG. 19 saw and support.

As hereinbefore mentioned, each of the conveyors 28, 30, 31 comprises a pair of conveyor chains. For example, a conveyor 31 includes a right-hand conveyor chain 31a and a left-hand conveyor chain 31b as illustrated in FIGS. 12, 14, 17 and 18. Referring particularly to FIGS. 17 and 18, the outlet ends of chains 31a and 31b pass around sprockets 202 secured in movable channels 204a and 204b respectively raised and lowered at their right end (as viewed in FIG. 17) by hydraulic cylinders 208a and 208b. The movable channels are located on either side of cant carrying rail 22' having nylon side covering layers 210 secured thereto. At the outside, the channels are guided by brackets 212. Cylinders 209 at the opposite ends of channels 204 operate in unison with cylinders 208 for raising and lowering the conveyor chains (see FIG. 14).

Figure 14:
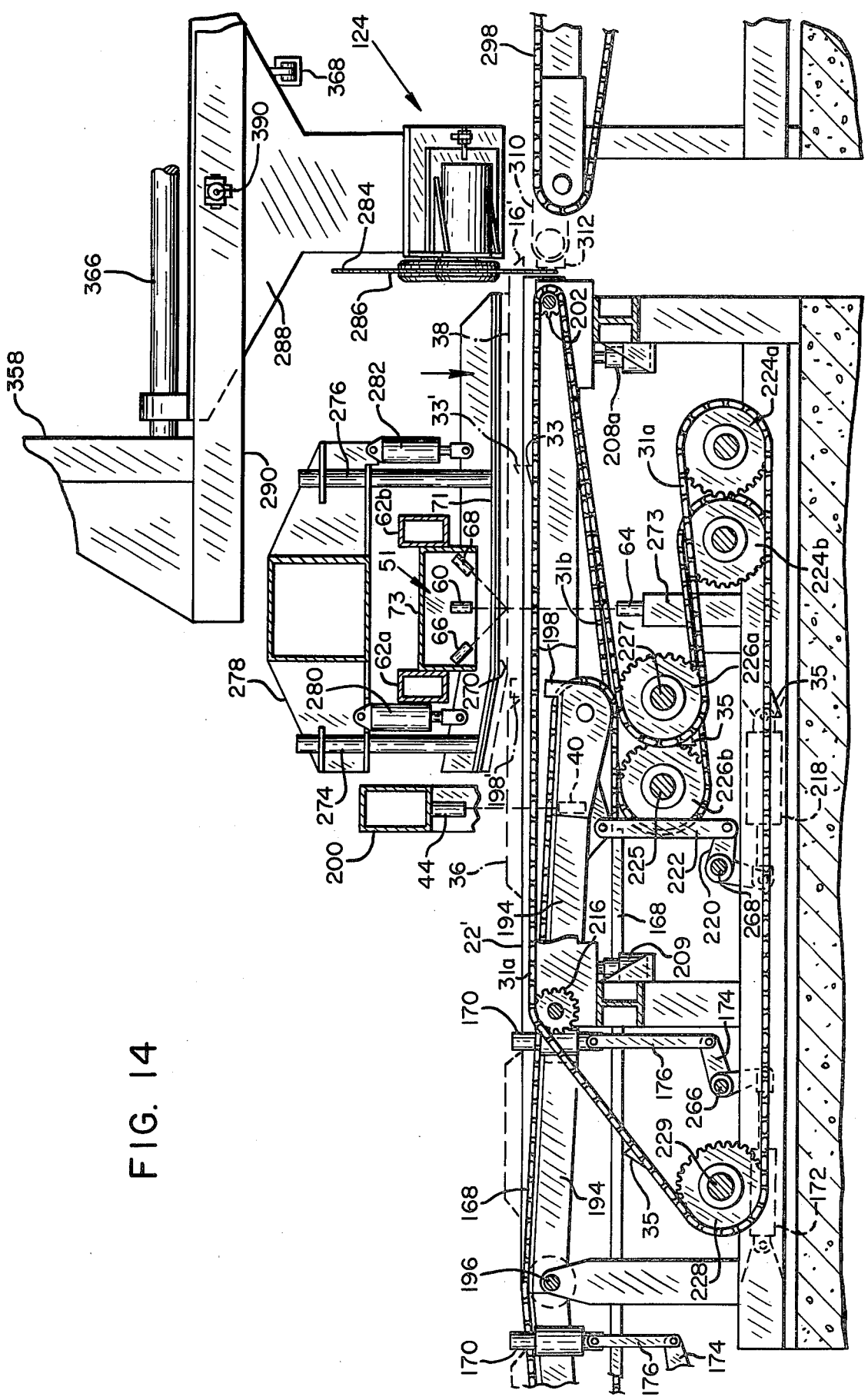
FIG. 14 is a partially cut away cross-sectional side view illustrating orienting conveyors, a scanner and movable saw means according to apparatus of the present invention.

In addition to carrying the sprockets, channels 204a and 204b carry chain supporting shelves 214 having a nylon top layer along which the runs of chains 31a and 31b extend. Chains 31a and 31b carry lugs 33 and 33' respectively (similar in function to lugs 32' and 34' in FIG. 1) for engaging the cant in position 28. Ordinarily, these lugs will not be in the same relative position on the chains, but are so depicted for purposes of illustration. Chain 31b is illustrated as raised by its corresponding hydraulic cylinder in FIGS. 17 and 18 for disposing lug 33' in engaging relation with the cant 38. Each of the chains, for example chain 31a, has additional cant engaging lugs 35 disposed therealong at equal intervals, as illustrated in FIG. 14. In particular, in the "home" position, the chain 31a will be located such that none of the lugs are positioned along the run of rail 22'. That is, in the home position, lug 33 will be on the chain around sprocket 202 while a following lug 35 will be just below the top of sprocket 216, ready for immediate engagment with a cant at position 36 when arm 194 lowers to the position shown.

The conveyor chains 31a and 31b are operated in the alternative such that one engages a given cant for moving the same below scanners 51 toward saw 124, while the remaining chain of the pair will engage and move the following cant (assuming it is the same length) as arm 194 is again lowered in response to detection of the next cant by light source, detector combination 40–44. Each of the other chain pair conveyors 28, 30, 31, operates in a similar manner, with the particular chain pair from conveyors 30, 31 being selected in addition to conveyor 28 according to the cant length detected by the light source, detector combination 40-44. The information as to the cant length is provided to computer 110 from source, detectors 40-44 and operates the correct conveyor pairs via cylinders 208, 209 in accordance with the cant length. If a next cant has substantially different detected length, of course a conveyor chain of another pair will be employed to pick it up rather than the alternate chain of the same pair.

FIG. 16 illustrates the drive for the various chain pairs. A chain 31a passes around sprocket 202a from the top run thereof and from there extends rearwardly around driven sprocket 226a secured to drive shaft 227. After passing around sprocket 226a, the chain 31a then proceeds forwardly again and engages sprocket 224a as can be seen in FIG. 14. The lower run of the chain then extends again in the reverse direction to a sprocket 228a mounted for rotation with respect to shaft 229, and from there to sprocket 216 (see FIG. 14). Similarly, chain 31b extends from sprocket 202b rearwardly around sprocket 226b secured to drive shaft 231. After extending around sprocket 226b, the chain passes forwardly again for engagement with sprocket 224b. From there, the lower portion of chain 31b passes rearwardly around sprocket 228b and returns upwardly to another sprocket 216.

Drive shafts 227 and 231 which bring about forward movement of chains 31a and 31b respectively, are driven by motors 234 and 236 by way of chains 238 and 240. Motor 234 is provided with a shaft position encoder 242 which, together with motor 234, is connected to computer 110 to indicate and direct the position of a cant carried by a chain 31a or 30a selected according to the length of a cant. Similarly, motor 236 is provided with a shaft position encoder 244 which, together with the motor, is connected to the computer to indicate and direct the position of the selected chain 31b or 30b. A common drive system is provided for conveyors 30, 31, with it being understood only one of the conveyors will be selected for upraised operation in accordance with the length of the cant as determined from detectors 44.

Conveyor 28 is provided with a separate drive system since it may execute a relative movement with respect to the selected of the conveyors 30, 31. The conveyor chain 28a passes around end sprocket 246a and from there forwardly to sprocket 250a before returning to sprocket 248a. The lower extent of the chain then runs forwardly and around sprocket 252a. Similarly, chain 28b extends to sprocket 246b and from there around sprocket 250b for passing to sprocket 248b. The chain then extends to sprocket 252b and upwardly toward the cant engaging rails. Chain 28a is driven by sprocket 250a from drive shaft 255 empowered by motor 254 through chain drive 258. Motor 254 is provided with a shaft encoder 262 which, together with motor 254, is coupled to computer 110 in such manner that the position of chain 28a can be ascertained and directed. Also, chain 28b is driven by means of drive shaft 257 from motor 256 engaging drive chain 260. Motor 256 is also provided with a shaft encoder 264 which, together with motor 256, is coupled to computer 110 for ascertaining and directing the linear position of chain 28b.

Also illustrated in FIG. 16 is a common shaft 266 operating levers 174 for lowering the last of the stops 170. A shaft 268 mounts lever 220 for lowering arms 194 at the same time.

As a cant, such as shown at 36 in FIG. 14, is released by the downward movement of arms 194 carrying dogs 198, and as the same is engaged by lugs 33 or 35 of chains 28, 30, 31, the cant will be moved forwardly along rail 22' and other parallel rails beneath scanners 51. Hold down shoes such as illustrated at 71 are desirably employed to contact the top surface of the cant such that scanners 51 can make a more accurate measurement, and such that the cant is held for sawing, as hereinafter more fully described. These shoes are suitably disposed across the apparatus between scanners 51. Each hold down shoe 71 is suitably provided with a lower nylon surface for engaging the cant, and is sloped upwardly at forward end 272 for receiving cants therebeneath. Each shoe is secured to a forward support rod 274 and a rearward support rod 276 slidably received in an upper support beam structure 278. Hydraulic cylinders 280 and 282 also are interposed between the beam structure 278 and hold down shoe 71 for positioning the hold down shoe accurately at the right level at just the right location above rail 22' and the other parallel rails for permitting slidable interposition of a cant 36 while the same is being detected via scanners 51.

Figure 12:
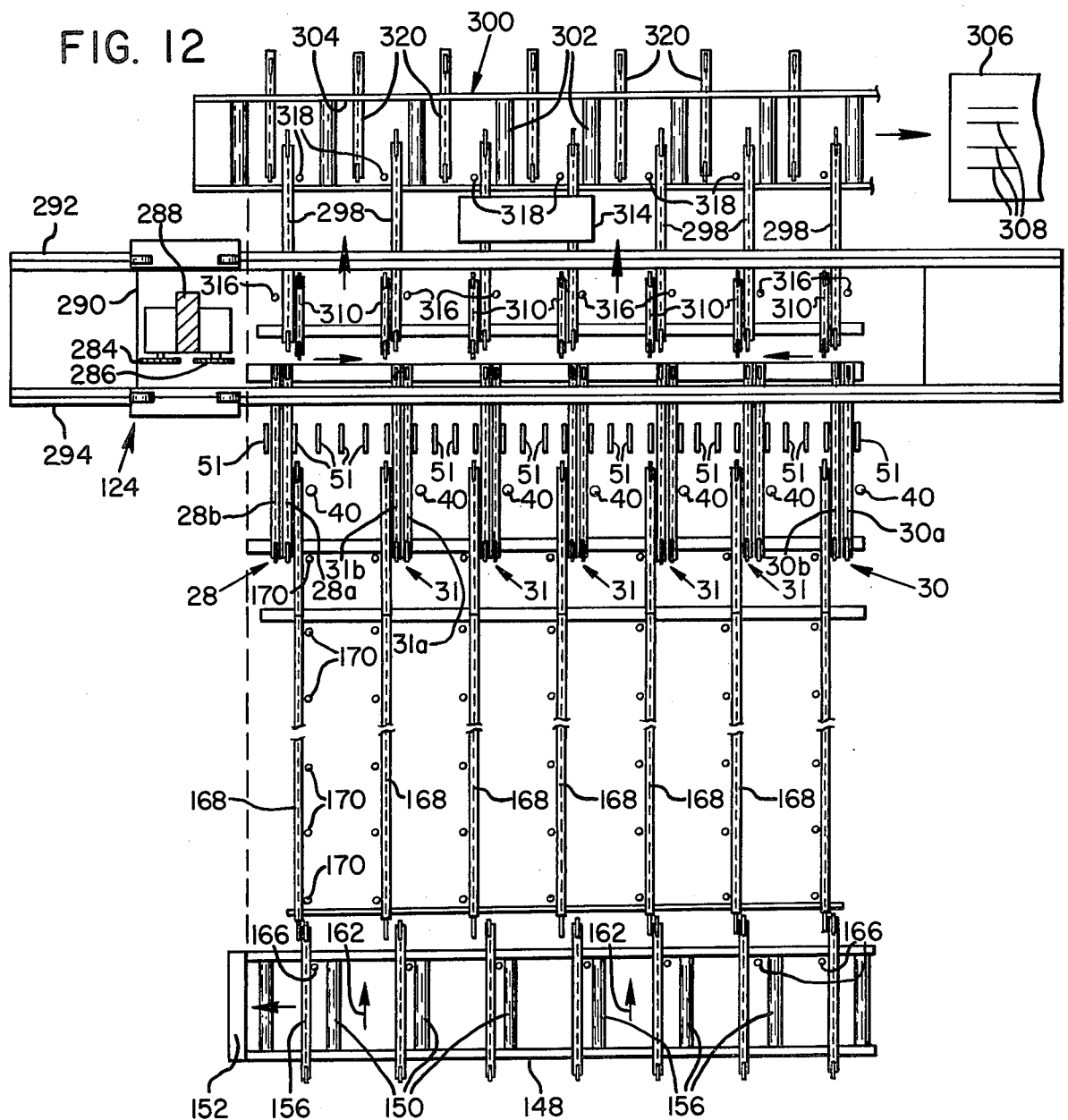
FIG. 12 is a plan view of automatic sawmill apparatus according to the present invention.
Figure 13A:
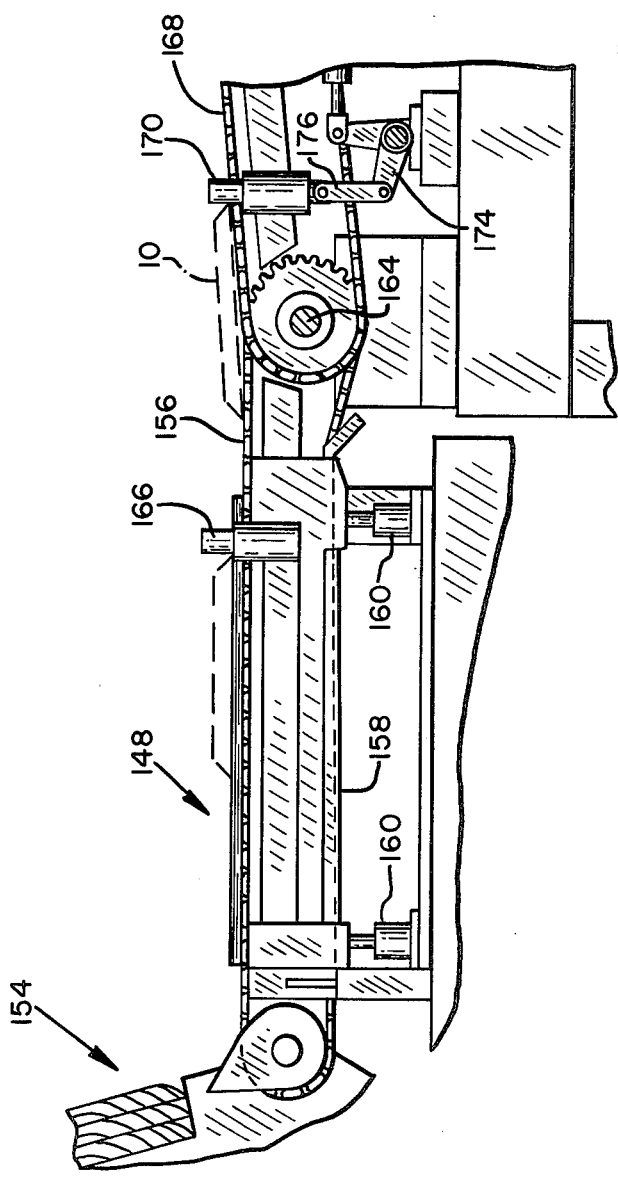
FIGS. 13A and 13B are partially cut away cross-sectional side views of an input conveyor portion of sawmill apparatus according to the present invention.
Figure 13B:
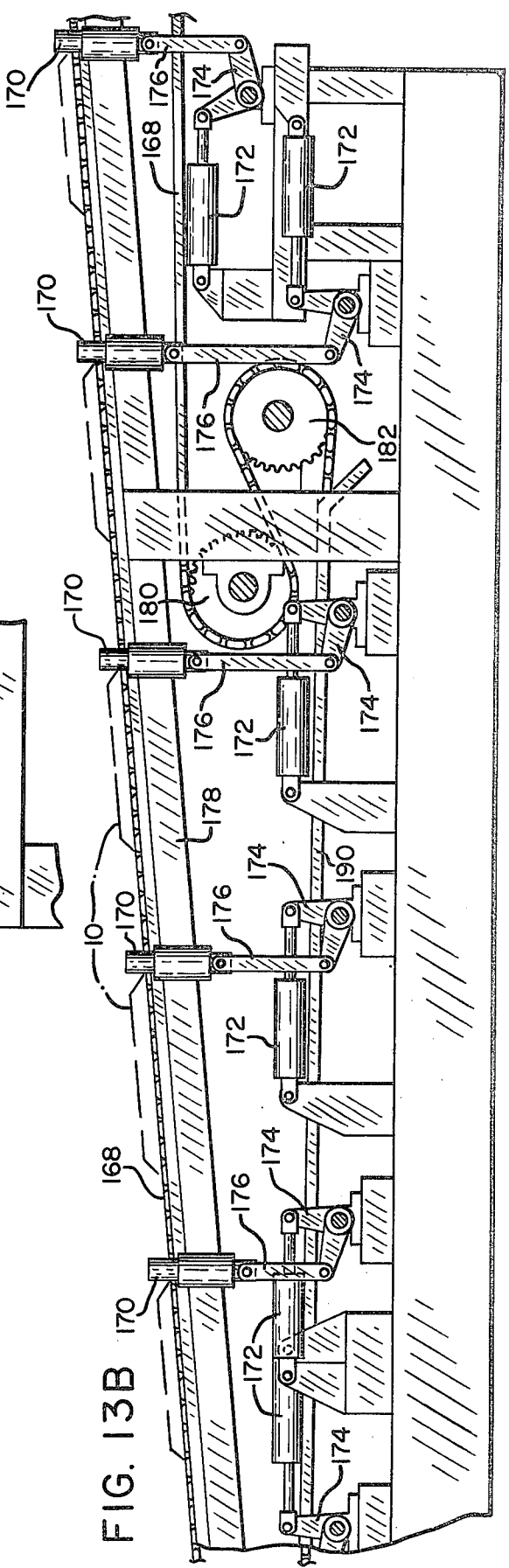

As viewed in FIGS. 12 and 14, the cant will pass under scanners 51 wherein each such scanner includes radiation sources 64, 66 and 68, and detector 60. Radiation source 64 is mounted on a subsupport 272, while sources 66 and 68 as well as detector 60 are mounted on a common support or enclosure 73 secured between two beam sections 62a and 62b extending across the apparatus. As hereinbefore described, the detectors 51 provide information as to the extent of the wanes as well as the acceptable wood surface therebetween. This information is suitably supplied to computer 110 for determining the relative position of the cant and the saw line 48 (in FIG. 1) which will intersect the cant within the irregular edge thereof for the purpose of removing such irregular edge, usually in the form of a wane. As hereinbefore mentioned, both conveyors, i.e., conveyor 28 and one of the conveyors 30, 31 can be moved forwardly in synchronism until the saw line will intersect the deepest wane point or irregularity. However, as hereinafter more fully described, it is preferred to move the conveyor 28 and one of the conveyors 30, 31 relative to each other such that the cant is moved angularly, if necessary, so that the saw line is positioned along the irregular edge, for example between two acceptable wood points or wane points. This sawing position will ordinarily provide a maximum amount of wood left for subsequent cutting and use.

The saw line is defined by the path of the operating blade or blades of saw 124, i.e., blades 284 and 286. Prior to passage of the saw, chain conveyor 28 and one of the chain conveyors 30, 31 is energized to bring the cant to position 38 at a location for removing a wane or other irregularity 16' at the leading lateral edge of the cant. A lug 33' (together with lug 32' on conveyor 28) then holds the cant 38 in position, together with hold down shoes 71, as the saw 124 traverses along the longitudinal length of the cant to remove the irregular or wane edge therefrom. The relative movement of the conveyors 28 and 30, 31 is suitably determined by computer 110 as hereinafter more fully described.

The saw moves across the apparatus and longitudinally of the cant upon a carriage 290 carried upon rails 292 and 294 disposed above the level of the conveyors. The removed irregular edge sawn from the cant drops downwardly and may be removed by another conveying system (not shown) disposed directly underneath the saw.

As illustrated in FIGS. 12 and 15, further conveyors 298 which are substantially parallel to and aligned with conveyors 28, 30, 31 are adapted to receive a sawn cant and deliver the same to an edger infeed roller conveyor 300 having live rollers 302 and a back stop 304 on the remote lateral edge thereof for indexing the now straight edge of the cant for use as a reference as the cant is moved by rolls 302 toward edger 306. The edger suitably includes a plurality of positionable circular saws indicated at 308 which are positioned to cut the cant into predetermined board sizes employing the edge straightened by saw 124 as the reference.

After the cut is completed by saw 124, auxiliary conveyors 310, which are normally positioned out of the way of saw 124, are now moved rearwardly of conveyors 298 (to the left in FIG. 15) toward conveyors 28, 30, 31, on bars 312 each provided with a plastic forward edge. These auxiliary conveyors, which are suitably moved into position by hydraulic cylinders 458 via double arm lever 460 and link 462, aid in receiving the cant as the same is propelled forwardly by conveyors 28, 30, 31. After use, the conveyors 310 are moved out of the way of saw 124.

Conveyors 298 receiving the cant first urge the same against stops 316 operated by cylinders 464 (see FIG. 12) and subsequently against stops 318 operated by cylinders 466 before delivery to edger infeed conveyor 300. It will be understood individual cants are successively received against stops 316, and then stops 318, so that when both sets of stops are lowered, a cant will pass forward to the next position as the conveyors 298 are continuously operated. Conveyors 298 slant downwardly toward lower conveyor 300, and a further set of chain conveyors 320 receives the cant and urges the same against an indexing backstop 304. Chain conveyors 320 are suitably of the same type of construction as chain conveyors 156 at an inlet end of the apparatus. That is, they are of a type which may be lowered and raised by means of hydraulic cylinders. The conveyors 320 are suitably in a raised position at the time they receive a cant from chain conveyors 298, and then after propelling the cant toward backstop 304, the conveyors 320 are lowered such that live rolls 302 of conveyor 300 will propel the cant toward edger 306.

Conveyor chains 298 pass over a first end sprocket 470 and a second end sprocket mounted on drive shaft 472 together with a drive sprocket 474 receiving drive chain 476. Chain 476 passes around a sprocket 478 mounted on the shaft of drive motor 480. Conveyor 310 is engaged on the underside thereof by a sprocket mounted on the same drive shaft 482 as sprocket 484. Sprocket 488 receives drive chain 486 which also passes over a sprocket 488 driven by motor 490. It will be seen that regardless of the position of conveyor 310, i.e., either at its inward position toward the saw line of saw 124, or in its withdrawn position, conveyor 310 will still be driven from motor 490.

As hereinbefore mentioned, the edger 306 cuts the cant into a plurality of boards by means of circular edger saws indicated at 308. The positions of edger saws 308 are "previewed" with respect to a cant lying against stops 318 on conveyors 298. At this time, the positions of edger saws 308 applicable thereto are coupled to a light source 314 suitably employing laser devices for projecting lines along the cant disposed against stops 318 indicative of the cuts which will be made in such cant. The light source 314 may be of a commercially available type, e.g., a device called a "Laser Blazer" manufactured by Laser Technical Industries, Lake Oswego, Oreg. The positions of edger saws 308 and hence the lights in light source 314 can be manually selected by conventional means, or may be determined by computer 110. It will be recalled the computer is provided with information from the scanners regarding not only the dimensions of the wane of a particular cant, but also the acceptable wood width between the leading wane and the trailing wane. This information is stored in the computer and may be used for positioning the conveyors 28, 30, 31 to position the cant relative to the saw line whereby the leading wane is substantially removed. The width of the acceptable wood is the perpendicular distance from the saw line to the closest acceptable wood point or wane point on the trailing wane. This width information may be used to access preferred schedules of saw cuts as stored in the computer memory for different widths of the cants. Thus, for any given acceptable wood width, a preferred schedule of board widths which can be obtained from the cant will be accessed, and this schedule employed for moving saws 308 and the corresponding lights in light source 314 to show the operator where the cuts will be made. If the operator observes these cuts and finds them unsuitable, e.g., because of imperfections in the wood, he can in any case override the computer output and manually control the positioning of edger saws 308 relative to the index provided by the forward lateral sawn edge of the cant.

FIGS. 19–25 illustrate saw 124 in greater detail. Referring to these drawings, the carriage 290 which supports the saw includes an overhead truck frame 322 provided with inwardly located track engaging wheels 324, 326, 328 and 330. Wheels 324 and 326 positioned on the side of the carriage closest to the edger infeed conveyor 300 are flat steel wheels for riding upon flat steel rail 292. However, the wheels 328 and 330 on the side of the carriage closer to scanners 51 are V-shaped for engaging V-rail 294. The upper carriage truck frame 322 is also provided at each end thereof with a track scraper 420 which may be formed of wood.

Rails 292 and 294 extend crossways of the apparatus as depicted in FIG. 12, being supported respectively by I beams 332 and 334 which extend crossways of the apparatus. In particular, rails 292 and 294 are respectively joined to plates 336 and 338 which are in turn bolted to I beams 332 and 334, as illustrated in FIG. 23. The beams 332 and 334 are positioned above the apparatus on vertical beam supports 416 and 418. Bolt 340 extends vertically through the flange of I beam 334 and threadably engages nut 342 secured to plate 338. A second bolt, numbered 344, extends downwardly in abutting relation with the top of the I beam flange, while threadably engaging nut 346 also secured to plate 338. The last mentioned bolt is employed for vertically adjusting the position of plate 338 relative to I beam 334, and therefore the vertical level of rail 294. As illustrated in FIGS. 24 and 25, bolts 340 and 344 alternate along the top of plate 338. A similar arrangement secures and positions plate 336 relative to the top flange of I beam 332.

A threaded rod 248 is employed for horizontally adjusting the position of rail 294. The threaded rod 348 extends through a plate 354 welded to the inner edges of the upper and lower flanges of I beam 334, and through the central web of rail 294. Nuts 352 secure threaded rod 348 to the rail 294, while nuts 350 secure the rod to plate 354, and are adjustable for adjusting the rail laterally and therefore determining the exact distance between rail 294 and rail 292. Lateral positioning of the saw can also be adjusted thereby. As illustrated in FIGS. 24 and 25, threaded rods 348 are positioned at intervals along rail 294.

An undercarriage 356 is supported below truck frame 322 and below the level of I beams 332 and 334 by means of four downwardly extending support posts 358. The undercarriage 356 includes end beams 360 and side beams 362, the latter supporting bearings 364 which receive cross shaft 366. Pivoting frame 288 is in turn attached to shaft 366 for rotation in the direction of the plane of the saw line. A hydraulic cylinder 368 is interposed between pivoting frame 288 and an ear 370 extending downwardly from an end beam 360 of the undercarriage, and is operated for rocking the saw 124 about the axis of shaft 366.

Pivoting frame 288 includes a lower saw support 372 which extends forwardly and rearwardly at the lower end of frame 288 and upon which saws 284 and 286 are respectively mounted. Each saw is provided with a hydraulic motor, e.g., motor 374 for rotating arbor 376 to which saw 286 is attached. The motor 372 is supported upon the plate 378 which is adjustable with respect to lower support 372 by means of adjustment 380 for accurately locating the saw line of the saw. Saw guards such as guard 382 are suitably secured to pivoting frame 288 and substantially cover the saw blades except for the lower portions thereof adapted to saw a cant 38.

As illustrated in FIG. 19, saw blade 286, when pivoted downwardly to the position shown, extends below the level of cant 38 for adequately sawing through the cant. In the position shown, saw blade 286 has just finished a cut along the forward longitudinal edge of cant 38, that is the saw has just passed from left to right as viewed in FIG. 19, with the saw blade 286 rotating in a clockwise direction. After cant 38 has been sawn, and a subsequent cant is presented for sawing, hydraulic cylinder 368 is actuated for rotating the frame 288 of saw 124 in a clockwise direction whereby saw blade 284 will extend below the level of the cant while saw 286 is upraised. The carriage 290 is then moved from right to left as viewed in FIG. 19 for sawing such subsequent cant. As indicated by the arrow, saw blade 284 rotates in a counterclockwise direction.

For the purpose of moving the carriage along the rails, the apparatus is provided at the right-hand end thereof (as viewed in FIGS. 19 and 20) with a cable drum 382 having a shaft 384 supported for rotation in bearings 386 located above support structure 388 between beams 332 and 334. A hydraulic motor 388 rotates drum 382 for pulling steel cable 390 which is wrapped around the drum. The upper reach of cable 390 extends along trough 392 provided with a nylon insert 294 and supported on cross braces 296 located between beams 332 and 334. The lower right end of cable 390 (as viewed in FIG. 19) is attached to the right end beam 360 of undercarriage 356. Also, the upper reach of the cable 390 passes from trough 392 around cable pulley 398 journaled on shaft 400 which is mounted for movement with slide 402 under the control of hydraulic cylinder 404 relative to base 406. (See FIGS. 21 and 22.) Pulley 398 is located between I beams 332 and 334. After passing around pulley 398, the cable returns to the opposite or left end beam 360 of the undercarriage 356. Base 406 is positioned upon support structure 408, which also mounts a hand-operated pump 412 used for pumping hydraulic cylinder 404 to move pulley 398 to the left in FIG. 21 and thereby take up any unnecessary slack in the cable 390, and shock absorbers 410 against which the carriage may be driven. At the opposite end of the saw run, similar shock absorbers 414 are positioned on support structure 388, also for stopping the carriage. Motor 388 drives the carriage 290 up to a maximum speed or 600 feet per minute, with acceleration and deceleration at either end.

As hereinbefore mentioned, computer 110 suitably receives information from scanners 51 as depicted schematically in FIG. 26, and operates motors 234, 236, 254 and 256 to skew chains 28, 30, 31 for placing the cant with its objectionable wane irregularities in a position intersecting the saw line 48 of saw 124. Shaft encoders 242, 244, 262 and 264 return information to computer 110 indicative of the position of the conveyor chains so the computer is able to stop the chain motors to position the chains at desired locations. The computer 110 is suitably an Intel type 8080 microprocessor manufactured by Intel, Inc., Santa Clara, Calif. FIG. 27 is a schematic representation of the leading lateral edge of a cant 10, having a wane 16 located forwardly of an acceptable wood surface 12 as the cant is moved by the conveyor system in the direction of arrow 430. The conveyors 28, 30, 31 have an initial home position wherein a lug, such as lug 33, is just below the top of sprocket 202 and the next lug, such as lug 35, is just below the top of sprocket 216, awaiting engagement with the next cant. Then, as the selected conveyor chains begin to move, distance is measured relative to the home position of lug 35.

When the cant travels through the scanners 51, and the most forward edge is detected by breaking the beams between a source 64 and a detector 60, the computer determines the most forward point 432, and hence a reference line from which other cant and wane points can be measured. As hereinbefore described, a plurality of wane points, 88, are calculated from the scanner information, comprising points approximately one-third the way down the wane which will be acceptable as a sawing point according to grading rules. The wane points are measured with respect to the reference line by noting the applicable shaft encoder output differences for the chains which are moving the cant. During measurement of the cant by scanners 51, both applicable chains are moved forward in a simultaneous and parallel manner and are not skewed until the cant passes through the scanners 51.

A maximum wane point, $W_m$ is ascertained for establishing a maximum wane line, as indicated in FIG. 29, from which wane points will be designated in the $+X$ direction and $-X$ direction indicated in FIG. 27. A saw line is then determined between $W_m$ and the next most indented wane point to the right of the maximum wane line, i.e., in a positive X direction in FIG. 27, this being wane point 88a. The computer 110 determines a computed saw line 1, $SX+b$, and determines whether any further wane points will fall back of this line, such as wane point 88b in FIG. 27. Then a saw line 2 is calculated and the process continues, to determine if any additional wane points are behind this line. Saw line 2, or some other subsequent line, may be selected as the positive X computed saw line. Next, the process is continued in a negative direction establishing saw line 3. The final saw line will be determined between computed saw lines 2 and 3 for maximizing the wood output, e.g., by selecting the line having the minimum slope.

FIG. 28 depicts the computer program in flow chart fashion for selecting the computed saw line. Referring to FIG. 28, the maximum wane point, $W_m$, is determined according to block 434 and thereafter the next most indented wane point, $W_m'$ is determined for the positive X direction in block 436, after which the slope, S, is calculated in block 438 describing a saw line $SX+b$, where b is a constant. P is set equal to 1, and in decision block 440, it is determined whether the next wane point in a positive direction is less than the saw line. If it is not, $W_m'$ is set equal to $W_m'+p$ in block 442, and return is made to block 438 for recalculating the saw line. If the next wane point is less than the saw line, the program proceeds to block 444 wherein P is increased by one and the program loops via decision block 446 until all wane points have been tested. The slope of the selected saw line (saw line 2 in FIG. 27) is stored for the positive X direction in block 448.

The procedure is repeated for the negative direction as illustrated at 450, after which points $I_A$, $I_B$, $I_C$ and $I_D$ are determined as indicated by block 452. These are points of intersection of the respective saw lines 2 and 3 with side references as indicated in FIG. 27. In decision block 454, if $I_A+I_B$ is not less than $I_C+I_D$, then the positive saw line 2 is selected as the final saw line. If, on the other hand, $I_A+I_B$ is less than $I_C+I_D$, then the negative saw line 3 is selected as the final saw line.

After scanning is accomplished by moving the cant through scanners 51, the selected pair of chains is stopped momentarily (as the aforementioned program is carried out) and the chains are then moved forwardly to position the computer-selected saw line in coincidence with the saw line 48 executed by saw 124. The distance between the scanners and blades of saw 124 is added to the computer determined saw line to arrive at the correct movement or positioning of the cant relative to saw 124.

The relative movement of respective chains is determined according to the distance of the chain from the left-hand side of the apparatus as viewed from the inlet end multiplied by the slope of the computed saw line. Thus, chains farther from the left-hand chain 28 will have to move a greater lineal distance to accomplish the same slope. Actually, both of the chains of the pair which moves the cant through the apparatus continue to move at the same speed after execution of the aforementioned program by the computer. However, one of the chains is directed to stop before the other, such that the computed slope will be accomplished in the positioning of the cant.

As can be seen, the cant is preferably oriented in angular fashion such that a saw line is defined between the two deepest wane points on the cant which do not leave other wane points within the saw line. If another wane point is left within the saw line, the saw line is redefined employing such a point. The resulting saw line is tangent at least at two locations to the curve joining the wane points, and does not pass through such curve.

Other software procedures may be employed in place of the aforementioned program. Thus, instead of starting with a maximum wane point and testing other wane points in a positive direction, one may start with a pair of arbitrarily selected wane points, such as the outermost. A line is calculated therebetween and if other wane points fall inside thereof, the farthest pair of these may be selected to define a new computed saw line, and so on, until no wane point falls within the final line. Such a program may be defined as follows:

1. Calculate a line between the two outermost wane points.
2. Determine if there are any wane points inside such line.
3. If there are two or more wane points inside the line, select the two most distant from each other and loop to step 1.
4. If there is only one wane point inside the line, select it and the previously selected wane point that is farthest from it. Loop to step 1.
5. If there are no wane points inside the line, the solution for the computed saw line is complete, so exit.

As hereinbefore mentioned, the computer can be employed also for setting the saws 308 of edger 306 as well as the lights of light source 314 for "previewing" cuts to be made by the edger. From the scanner information, relating to the leading and trailing wane, the minimum distance from the selected saw line to any wane point on the trailing wane is determined. The computer memory desirably stores a selection of cuts as will produce the most valuable wood output from the cant. The stored information is then utilized to position saws 308 in edger 306 as well as lights in light source 314. Assuming the operator does not override the stored instructions, the cant will be cut by the edger into boards, following the stored instructions, and relative to a sawing index provided by the sawn forward edge of the edge as placed against backstop 304.

Rather than employing edger 306 to make a plurality of cuts in the cant, the saw 124 may be directed to remove the trailing edge of the cant after forward movement of the cant on the conveyors 28, 30, 31, such that a trailing saw line is determined, parallel to the initial saw line, and passing through the wane point closest to the initial saw line. Alternatively, stored memory instructions may be used to determine the trailing saw line such that a given standard lumber content is determined. Then the resulting board can subsequently be sawn in a prescribed manner to recover this lumber. After complete sawing of the cant with saw 124, the chains are run to home position, with their forward lugs positioned over the ends of sprockets 202. The successive movement of conveyors, such as chains 31a and 31b, and the successive operation of stops 170 is preferably governed according to the "demand" of edger 306, and saw 124, and the movement is governed to provide a smooth and rapid flow of wood as determined primarily by the speed of operation of the saws.

Reviewing the overall operation of the present invention, cants are delivered one at a time to conveyor 148 and "even ended" against stop 152 such that the cants will have the same left-hand reference position as viewed in FIG. 12. The cants are received seriatum on conveyor chains 168 such that one cant is positioned between each pair of stops 170 and is urged against trailing stops as the conveyor chains 168 move forwardly. The stops 170 are operated together allowing each cant to progress successively to a location between a next pair of stops and specifically against the trailing stop of the pair.

The overall operation including the operation of the progression of cants along the conveying system can be supervised manually via hydraulic controls, but is preferably computer synchronized from edger 306 whereby the progression of cants is requested following the removal of each cant from conveyor 300 for sawing in the edger. When a cant reaches the location under detectors 44, e.g., at the position of cant 36 in FIG. 14, arms 194 are hydraulically lowered in response to such detection through action of hydraulic cylinders 218, assuming the preceding cant is being sawn and demand is being made by the edger. Detectors 44 also measure the length of the cant and determine which chain conveyors will now move the cant forwardly through scanners 51 and then to the sawing position. Conveyor 28 will always be selected, since the cants have been even ended toward the position denoted by the dashed line at the left of FIG. 12. One of the remaining chain conveyors 30, 31 will be selected according to the cant length as sensed by detectors 44. The selected conveyor of conveyors 30, 31 is upraised into cant-engaging position by hydraulic cylinders 208, 209. The conveyors will then move the cant forwardly through the scanners where the leading wane will be detected, as well as the trailing wane and the acceptable wood therebetween.

The information from the scanners 51 is suitably provided to computer 110 which is also responsive to the position of the motors operating the selected conveyors 28, 30, 31. The computer is programmed, e.g., in accordance with the program illustrated in FIG. 28, for positioning conveyors 28, 30, 31 to position the forward edge of the cant with respect to the saw line whereby the wane edge will be substantially removed without unnecessary waste. The calculated saw line is positioned in coincidence with the saw line 48 of saw 124, and is chosen to be substantially tangent at two locations to the curve joining wane points, without otherwise intersecting such curve.

The conveyors 28, 30, 31 each comprise a pair of conveyor chains which operate in the alternative. In the case of conveyor 28, for example, first chain 28a receives and propels a cant, after which chain 28b similarly engages the following cant, whereby another cant will be substantially immediately ready for sawing after the previous cant has been sawn. Thus, while one cant is being sawn by saw 124, the following cant may be passing toward and under the scanners 51. Of course, a given conveyor 30, 31 will individually receive successive cants on the left and right chains thereof, only if successive cants have a substantially similar length. This occurs in many cases since a succession of cants will be derived from the same log. However, as cant length changes, the selection of chain conveyors 30, 31 also changes.

After positioning of the cant at the sawing location in an accurate manner, the saw 124 is activated for making a pass longitudinally of the cant for removing the wane thereof. During the sawing operation, the cant is held in a stationary position by lugs 32', and 33' or 34', as well as by hold down shoes 71, thereby maintaining an accurate location for the cant while sawing is accomplished. The saw moves across the conveyor system in a first direction with one of its rotary blades in depending position to remove a wane from a first cant. After a following cant is located and held in sawing position, the saw is moved across the conveyor system in a second and reverse direction with a second and counter-rotating rotary blade in depending position for removing the wane from the next and following cant.

Each cant having the forward wane removed therefrom to provide a flat forward indexing edge is then carried forwardly by conveyors 28, 30, 31 and by conveyors 310 which are moved into position by means of hydraulic cylinders 458 after passage of saw 124. The cant will be placed against stops 316, and subsequently against stops 318. After positioning of a cant on conveyors 298, conveyors 310 are withdrawn such that saw 124 is able to execute another pass.

A light source 314 projects a plurality of lines on the cant thereunder positioned against stops 318 indicative of the boards to be sawn in edger 306. The information for the projection lines is provided by computer 110 according to the board widths as may be accomplished within the width of the cant. Thus, as hereinbefore mentioned, scanners 51 ascertain the acceptable width between the forward and trailing wanes, and desirably access a cutting schedule in computer memory corresponding to such width. In its simplest form, the cutting schedule would merely prescribe the number of four inch widths obtained within a given width. However, greater widths will desirably be scheduled if the cant is wide enough to accommodate the same, and even a two inch width can be prescribed on one edge.

Ordinarily, the sawing schedule "previewed" by light source 314 will then be accomplished by edger 306. However, if the operator detects a cutting such that an undesired imperfection would interfere, for example, with cutting of a large board, the operator may override the stored instructions and choose different instructions whereby a different cut will be accomplished in the edger.

With the next lowering of stops 316 and 318, the cant will move forwardly against stop 304 and will then be propelled lengthwise by conveyor 300 toward the edger utilizing the forward sawn edge of the cant as on index.

The apparatus according to the present invention provides for the rapid processing of a large number of cants through a sawing station for removing the irregularities on the forward lateral edges therefrom. This removal is accomplished substantially automatically and rapidly without sacrifice of accuracy in the sawing operation. The cant being sawn is maintained in a stationary position following automatic measurement thereof and on the same conveying system, whereby its position is accurately held and is not subject to change as in the case of removing a cant to a second conveying system for sawing. The same conveying system which moves the cant through the scanner has its forward movement adjusted for final positioning of the cant. The movable saw carriage is then propelled rapidly lengthwise along the lateral edge of the fixed cant for accurately removing the irregular edge therefrom, and as successive cants are moved forwardly, the saw carriage is transported back and forth for accurately removing the irregular forward edge from the successive cants. The accurately forward edge is then employed as an index for the sawing of a cant into a number of boards as advantageously accessed from the computer in accordance with the width measurements made by the scanners. Selecting the saw line and the board widths in this way is found to produce optimum lumber output. Thus, accommodating the saw line tangentially and accurately along the wane is more apt to produce additional lumber output, for example, even by the production of short additional pieces of given dimension from the side of the cant opposite the leading wane.

While we have shown and described a preferred embodiment of our invention, it will be apparent to those skilled in the art that many changes and modifications may be made without departing from our invention in its broader aspects. We therefore intend the appended claims to cover all such changes and modifications as fall within the spirit and scope of our invention.

We claim:

1. Apparatus for processing cants sawn from logs and characterized by a longitudinal dimension acquired lengthways from a said log and a width dimension acquired crossways of said log and having at least one irregular lateral edge, said apparatus comprising:
   means for detecting irregularities along the lateral edge of said cant,
   means for relatively positioning said cant and a saw line in response to said detection so that said saw line is disposed along said irregular lateral edge and intersects the same at a plane substantially inward from irregularities of said lateral edge,
   a power saw adapted for cutting said lateral edge,
   and means for moving said power saw longitudinally of said cant along said saw line while said cant is in a stationary position for sawing a straight lateral edge along said cant to remove said irregularities.

2. Apparatus for processing cants sawn from logs characterized by a longitudinal dimension acquired lengthways from a said log and width dimension acquired crossways of said log and having at least one irregular lateral edge, said apparatus comprising:
   means for moving the cant laterally with said irregular edge leading,
   means positioned along the direction of movement of said cant for detecting irregularities in the forward lateral edge thereof,
   said means for moving being responsive to said detection for angularly moving said cant, discontinuing forward movement of said cant and holding said cant in a stationary position intersecting a saw line disposed along the said irregular edge of said cant substantially tangent along selected inner irregularities thereof,
   a power saw adapted for cutting said lateral edge,
   and means for moving said saw longitudinally of said cant along said saw line while said cant is in a stationary position for substantially removing irregularities on the said lateral edge of said cant.

3. The apparatus according to claim 2 wherein said apparatus is adapted to receive successive cants, and wherein said means for moving said power saw relative to the cant moves said power saw in a first direction across the direction of travel of said cants to remove irregularities from the lateral edge of a first cant, and in a reverse direction for removing irregularities from the lateral edge of the next cant.

4. The apparatus according to claim 3 wherein said saw includes a pair of saw blades including a first blade oriented for sawing across the direction of movement of said cants when said saw moves in a said first direction, and a second reversely oriented saw blade oriented for sawing reversely across the direction of movement of said cants when said saw moves in said reverse direction.

5. The apparatus according to claim 2 wherein said detecting means comprises means for detecting the wane at the lateral edge of said cant and defining a saw line intersecting position for substantially removing said wane.

6. The apparatus according to claim 2 wherein said means for moving the cant comprises first and second conveyors spaced from each other along said cant adapted for forwardly moving said cant and for relative movement with respect to one another, said conveyors being responsive to said detecting means for angularly moving said cant and stopping said cant in a position wherein said saw line intersects the cant for substantially removing irregularities on the lateral edge thereof.

7. The apparatus according to claim 6 wherein said conveyors each comprise a pair of chains having lugs for engaging a cant, the individual chains of each pair of chains operating alternatively for moving successive cants.

8. The apparatus according to claim 2 including further means for sawing said cant into boards of predetermined width, said further means comprising a plurality of saws and a reference edge for receiving said lateral edge of said cant having the irregularities substantially removed therefrom.

9. The apparatus according to claim 3 wherein said power saw comprises:
   a pivotable frame,
   first and second circular saws carried by said pivotable frame respectively on either side thereof so that when said frame is pivoted in one direction the first circular saw is lowered in the plane of said saw line and when said frame is pivoted in the opposite direction the second circular saw is lowered in the plane of said saw line,
   motor means for rotating said circular saws,
   carriage means for supporting said pivotable frame and control means disposed between said pivotable frame and said carriage for pivoting said frame,
   and rail means disposed in a direction parallel to said saw line for carrying said carriage means including said saw across the path of a said cant and in intersecting relation therewith,
   wherein said means for moving said saw propels said carriage in opposite directions across the path of said cant,
   said control means being operable to pivot said frame in a first pivoting direction for lowering said first circular saw when said carriage moves in a first direction and for pivoting said frame in the opposite direction to lower said second circular saw when said carriage moves in the opposite direction.

10. An apparatus for processing cants sawn from logs and characterized by a longitudinal dimension acquired lengthways from a said log and a width dimension acquired crossways of said log and having at least one irregular lateral edge, comprising:
   first conveyor means for receiving said cants and propelling the same lengthways toward a stop for even ending said cants,
   second conveyor means for individually receiving said cants for moving said cants laterally with a said irregular lateral edge in leading position,
   a plurality of pin stops located along said second conveyor means wherein said pin stops are spaced farther apart along said second conveyor means than the width of said cants and hold said cants against forward movement as said second conveyor means tends to move said cants, said pin stops being operable for lowering and allowing said cants to pass one at a time to positions between the next pairs of pin stops,
   third conveyor means for individually receiving said cants from said second conveyor means, said third conveyor means being controlled for positioning movement, a plurality of scanners located adjacent said third conveyor means and responsive to the forward irregular lateral edge of said cants as said cants move on said third conveyor means relative to said scanners, said third conveyor means being responsive to said scanners for positioning a cant relative to a saw line for intersecting a said cant substantially within irregularities on the lateral edge thereof, clamping means for holding a said cant after positioning thereof by said third conveyor means, and a saw movable across the path of said third conveyor means at the forward edge of said third conveyor means for sawing a said cant along said saw line while said cant is held by said clamping means, substantially to remove the irregularities from the forward edge of said cant.

11. The apparatus according to claim 10 wherein said third conveyor means comprises pairs of alternatively operable conveyors having lugs for alternatively receiving and moving successive cants toward said saw line.

12. The apparatus according to claim 10 further including fourth conveyor means for receiving a said cant after substantial removal of irregularities from the lateral edge thereof, and a conveyor receiving a said cant from said fourth conveyor means and having an abutment for receiving the straightened lateral edge of a cant thereagainst for providing a reference edge for further sawing.

13. The apparatus according to claim 12 further including edger means for sawing said cant relative to said reference edge.

14. The apparatus according to claim 2 additionally including hold-down means positioned in spaced relation above said means for moving the cant for additionally holding said cant in a stationary position when said power saw is moved longitudinally for removing said irregularities on the lateral edge of said cant.

15. Apparatus for processing cants sawn from logs characterized by a longitudinal dimension acquired lengthways from a said log and a width dimension acquired crossways of said log and having at least one irregular lateral edge, said apparatus comprising:

a conveyor system for receiving and moving a plurality of cants with irregular edges leading, said conveyor system including means for receiving and spacing said cants along said conveyor system for substantially simultaneous movement in spaced relation to one another, means positioned along the direction of movement of said cants adjacent said conveyor system for detecting irregularities in the forward lateral edge of each said cant, said conveyor system including conveyor means for moving said cants relative to said means for detecting irregularities and being responsive to detection of irregularities for angularly moving each said cant to a stationary position intersecting a saw line disposed along the irregular lateral edge of each said cant substantially within irregularities thereof, a power saw adapted for cutting said lateral edge of each said cant, and means for moving said power saw longitudinally of each cant along said saw line while a said cant is in a stationary position for substantially removing irregularities on the said lateral edge of said cant.

16. The apparatus according to claim 15 wherein said means for moving said power saw relative to a cant moves said power saw in a first direction across the direction of travel of said cants to remove irregularities from the lateral edge of a given cant, and in a reverse direction for removing irregularities from the lateral edge of the next cant.

17. The apparatus including claim 15 wherein said conveyor means comprises a pair of spaced conveyors adapted for engaging a cant at spaced locations along the cant and forwardly moving said cant relative to said detecting means and towards said saw line, wherein said pair of conveyors is responsive to said detection for differential movement with respect to one another in angularly positioning a said cant.

18. The apparatus according to claim 17 wherein each of said pair of conveyors comprises a chain conveyor adapted to engage said cant and move the same forwardly past said detecting means, and means for powering said chain conveyors for forward movement simultaneously past the detecting means, said powering means being responsive to said detecting means for differentially stopping said chain conveyors as the portion of said cant engaged thereby reaches a predetermined position intersecting said saw line disposed along the said irregular lateral edge of a said cant.

19. The apparatus according to claim 18 wherein each of said chain conveyors comprises a pair of chains having lugs for engaging a cant, the individual chains of each pair operating alternatively for moving successive cants toward said saw line.

20. The apparatus according to claim 15 wherein said conveyor system is adapted to move said cants successively past said detecting means to said saw line and wherein said conveyor system moves said plurality of cants further forwardly after each cant is sawn by said power saw.

21. The apparatus according to claim 20 further including edger means receiving sawn cants from said conveyor system for further sawing a said cant to desired width, movement of the conveyor system carrying said cants being responsive to operation of said edger means for moving said plurality of cants forwardly to be sawn as edger means completes sawing operations.

22. The apparatus according to claim 21 wherein said detecting means also detects the width of each said cant and wherein said edger means is responsive to the detection of width for sawing cants into predetermined width boards.

* * * * *